United States Patent
Ravichandran et al.

(10) Patent No.: US 10,850,734 B2
(45) Date of Patent: Dec. 1, 2020

(54) PROCESSING A REQUEST SIGNAL REGARDING OPERATION OF AN AUTONOMOUS VEHICLE

(71) Applicant: Motional AD LLC, Boston, MA (US)

(72) Inventors: Harshavardhan Ravichandran, Singapore (SG); Karl Iagnemma, Cambridge, MA (US); Eric Wolff, Cambridge, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 15/477,936

(22) Filed: Apr. 3, 2017

(65) Prior Publication Data
US 2018/0281796 A1    Oct. 4, 2018

(51) Int. Cl.
| | |
|---|---|
| *B60W 30/18* | (2012.01) |
| *B60W 50/10* | (2012.01) |
| *B60W 40/04* | (2006.01) |
| *B60W 50/00* | (2006.01) |
| *B60W 50/08* | (2020.01) |
| *B60W 50/038* | (2012.01) |

(52) U.S. Cl.
CPC .......... *B60W 30/181* (2013.01); *B60W 40/04* (2013.01); *B60W 50/0097* (2013.01); *B60W 50/0098* (2013.01); *B60W 50/038* (2013.01); *B60W 50/08* (2013.01); *B60W 50/10* (2013.01); *B60W 2556/50* (2020.02); *B60W 2556/55* (2020.02)

(58) Field of Classification Search
CPC .................................................. B60W 30/181
See application file for complete search history.

(56) References Cited

U.S. PATENT DOCUMENTS

| | | | |
|---|---|---|---|
| 9,139,199 B2 | 9/2015 | Harvey | |
| 9,405,293 B2* | 8/2016 | Meuleau | G05D 1/021 |
| 9,493,158 B2 | 11/2016 | Harvey | |
| 9,551,992 B1 | 1/2017 | Barton-Sweeney et al. | |
| 9,754,490 B2* | 9/2017 | Kentley | G06K 9/00805 |
| 9,821,807 B2* | 11/2017 | Herbach | B62D 15/025 |
| 9,953,539 B1* | 4/2018 | Gkiotsalitis | G08G 1/202 |
| 10,144,419 B2* | 12/2018 | Viehmann | B60W 30/09 |
| 2011/0241862 A1 | 10/2011 | Debouk et al. | |
| 2013/0173159 A1 | 7/2013 | Trum et al. | |
| 2015/0112571 A1 | 4/2015 | Schmudderich | |
| 2015/0153733 A1 | 6/2015 | Ohmura et al. | |
| 2015/0178998 A1 | 6/2015 | Attard et al. | |

(Continued)

FOREIGN PATENT DOCUMENTS

JP    2018-012478    1/2018

OTHER PUBLICATIONS

U.S. Appl. No. 15/477,833, filed Apr. 3, 2017, Ravichandran et al.

(Continued)

*Primary Examiner* — Michael A Berns
(74) *Attorney, Agent, or Firm* — Fish & Richardson P.C.

(57) ABSTRACT

Among other things, a vehicle drives autonomously on a trajectory through a road network to a goal location based on an automatic process for planning the trajectory without human intervention; and an automatic process alters the planning of the trajectory to reach a target location based on a request received from an occupant of the vehicle to engage in a speed-reducing maneuver.

51 Claims, 13 Drawing Sheets

(56) References Cited

U.S. PATENT DOCUMENTS

| | | | |
|---|---|---|---|
| 2015/0338849 A1* | 11/2015 | Nemec | G05D 1/0055 |
| | | | 701/25 |
| 2015/0345959 A1 | 12/2015 | Meuleau | |
| 2015/0379468 A1 | 12/2015 | Harvey | |
| 2016/0071418 A1 | 3/2016 | Oshida et al. | |
| 2017/0057510 A1 | 3/2017 | Herbach et al. | |
| 2017/0090480 A1 | 3/2017 | Ho et al. | |
| 2017/0144658 A1 | 5/2017 | Viehmann | |
| 2018/0188726 A1* | 7/2018 | Newman | G01C 21/3407 |
| 2018/0276485 A1 | 9/2018 | Heck et al. | |
| 2018/0281794 A1 | 10/2018 | Ravichandran et al. | |
| 2018/0281795 A1 | 10/2018 | Ravichandran et al. | |
| 2018/0281817 A1 | 10/2018 | Ravichandran et al. | |
| 2018/0284771 A1 | 10/2018 | Ravichandran et al. | |
| 2018/0284772 A1 | 10/2018 | Ravichandran et al. | |
| 2019/0367046 A1 | 12/2019 | Ravichandran et al. | |

OTHER PUBLICATIONS

U.S. Appl. No. 15/477,872, filed Apr. 3, 2017, Ravichandran et al.
U.S. Appl. No. 15/477,882, filed Apr. 3, 2017, Ravichandran et al.
U.S. Appl. No. 15/477,930, filed Apr. 3, 2017, Ravichandran et al.
U.S. Appl. No. 15/477,970, filed Apr. 3, 2017, Ravichandran et al.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
Luzcando (searcher), "EIC 3600 Search Report," STIC-Scientific & Technical Information Center, Feb. 14, 2018, 20 pages.
U.S. Notice of Allowance in U.S. Appl. No. 15/477,833, dated Mar. 8, 2019, 7 pages.
U.S. Notice of Allowance in U.S. Appl. No. 15/477,970, dated Mar. 8, 2019, 8 pages.
U.S. Office Action in U.S. Appl. No. 15/477,833, dated Mar. 27, 2018, 23 pages.
U.S. Office Action in U.S. Appl. No. 15/477,833, dated Oct. 12, 2018, 34 pages.
U.S. Office Action in U.S. Appl. No. 15/477,872, dated Apr. 10, 2019, 18 pages.
U.S. Office Action in U.S. Appl. No. 15/477,882, dated Apr. 30, 2019, 9 pages.
U.S. Office Action in U.S. Appl. No. 15/477,930, dated Jan. 8, 2019, 36 pages.
U.S. Office Action in U.S. Appl. No. 15/477,970, dated Apr. 5, 2018, 16 pages.
U.S. Office Action in U.S. Appl. No. 15/477,970, dated Oct. 12, 2018, 15 pages.
U.S. Appl. No. 16/544,278, filed Apr. 3, 2017, Ravichandran et al.

* cited by examiner

PROCESSING A REQUEST SIGNAL REGARDING OPERATION OF AN AUTONOMOUS VEHICLE

BACKGROUND

While driving on a road, an autonomous vehicle (AV) may need to stop immediately or come to stop within a short time (e.g., 5 seconds or 10 seconds) or distance (e.g., 10 meters).

SUMMARY

The technologies described in this document enable an AV to accept, process, and respond to a signal indicating a request to stop or make an otherwise speed-reducing maneuver. The response to the signal can include evaluating features of the request (e.g., a request type, a way of the request being made, and a frequency of the request, a degree of urgency, a road environment, an expected stopping time interval, map data, sensor data, or a combination of two or more of them or other factors) to identify a target location (e.g., a target stopping place) for the AV. The AV (or an AV system associated with the AV) plans a trajectory from a current location to the target location and executes the trajectory plan. A status of the target location can be updated continuously based on newly observed or received data until the AV reaches the target location. However, if the target location becomes unavailable or otherwise inappropriate during the execution of the trajectory plan, the AV system can identify another target location and adapt the trajectory plan accordingly.

In general, in an aspect, a vehicle is caused to drive autonomously on a road network. In response to a request signal representing a request for the vehicle to engage in a speed-reducing safety maneuver, a vehicle system (a) computationally analyzes data to choose a target location for the maneuver, and (b) causes the vehicle to drive autonomously toward the target location and engage in the maneuver. The operations (a) and (b) are repeated until the vehicle completes the maneuver at the target location. The target location may comprise a target stopping place. The speed-reducing maneuver may comprise stopping the vehicle.

Some implementations may comprise receiving the request signal from an occupant, a teleoperator, or a software or hardware process. The request signal may comprise at least some of the data received from a user interface in the vehicle resulting from an interaction by an occupant of the vehicle. The user interface may comprise a button, a switch, a pull-cord, a pedal, a pad, a sensor, a whistle, a display, or a voice assistant, or a combination of two or more of them. Receiving the request signal may include receiving a command from the teleoperator via telecommunications. In some implementations, receiving the request signal may comprise receiving the request from the software or hardware process based on degradation in performance of the vehicle. The degradation in performance may comprise degradation in performance of a sensor or a component of the vehicle. Receiving the request signal may comprise receiving the request from the software or hardware process based on detection of an event on the road network.

In some implementations, the request signal or the data comprises a degree of urgency. The degree of urgency may have been indicated by an initiator of the request signal. Implementations may include inferring the degree of urgency by an algorithmic analysis of the request. The algorithmic analysis may comprise analysis of a frequency, a volume, a sound, a voice, or a type, or two or more of them, of an oral request.

Implementations may include data comprising an expected stopping time interval. The expected stopping time interval may have been indicated by an initiator of the request signal. The expected stopping time interval may be inferred by an algorithmic analysis on the request. The algorithmic analysis may comprise analysis of data associated with the request. The data may comprise traffic data, sensor data, or map data, or two or more of them. Analyzing the data may comprise evaluating quality of one or more target locations. The quality may be evaluated offline relative to the vehicle, or online when the vehicle is driving, or both. Evaluating of the quality may comprise computing a quality based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope. One or more of the factors can be represented by numerical values; each of the numerical values may be mapped to a pre-defined range. Computing the quality may include assigning weights to one or more of the factors. The weights may be based on one or more of the following: features of the request, a type of the vehicle, a regulation, a degree of urgency, and an expected stopping time interval. Some embodiments ignore a target location based on its quality value or information specifying its exclusion. Some cases may classify target locations in quality categories.

Implementations may include analyzing the data comprises applying a minimum quality threshold to identify one or more acceptable target locations. Computing the minimum quality threshold may be based on one or more of the following: a degree of urgency, an expected stopping time interval, and a conflicting rule.

Implementations may include analyzing the data comprises identifying a region for choosing a target location. The region may comprise a drivable area or a non-drivable area or both. The region may comprise an area faced by a forward-facing side of the vehicle. The region may comprise a shape or a size or both. Some cases include determining the shape or the size based on a traffic condition or on a degree of urgency or on both. Some applications may determine the region based on qualities of one or more target locations. Implementations may include expanding the region when no target location is identified, or updating the region based on a new location of the vehicle, or both. Implementations of choosing a target location may comprises discretizing the region into potential target places, or using availability data, or both. The availability data may be acquired from one or more of the following: a crowd-sourced database, a sensor, a perception process, a historical database, a parking lot database, a parking space database, the vehicle, and another vehicle.

In general, in an aspect, a vehicle is caused to drive autonomously on a road network. A computer associated with the vehicle may receive a signal representing a request for an emergency stop or an identification of an emergency condition, and analyze the request or the emergency condition and data, to identify a target location for stopping. The vehicle may be further caused to move autonomously to and stop at the target location. Implementations may include receiving the signal from (a) an occupant, (b) a teleoperator, or (c) a software or hardware process that identifies the emergency condition. Receiving the signal may comprise receiving at least some of the data from a user interface in the vehicle resulting from an interaction by an occupant of the vehicle. The interface may comprise a button, a switch, a pull-cord, a pedal, a pad, a sensor, a whistle, a display, or a voice assistant, or a combination of two or more of them. Implementations of receiving the signal may comprise receiving a command from a teleoperator via telecommunications. In some cases, the signal may be initiated by a software or hardware process based on degradation in performance of the vehicle. The degradation in performance may comprise degradation in performance of a sensor or a component of the vehicle.

In some implementations, the signal is initiated by detection of an event on the road network. In some embodiments, data or signal comprises a degree of urgency. The degree of urgency may have been indicated an initiator of the signal. Implementations may include inferring the degree of urgency by an algorithmic analysis on the signal. The algorithmic analysis may comprise analysis of a frequency, a volume, a sound, a voice, or a type, or two or more of them, of an oral request.

In some applications, the data or the signal may comprise an expected stopping time interval. The expected stopping time interval may be received from an initiator of the signal, or inferred by an algorithmic analysis on the signal, or both. The algorithmic analysis may comprise analyzing the data.

Implementations may include data comprises traffic data, sensor data, map data, or two or more of them.

Implementations may include analyzing the request based on evaluating quality of one or more target locations. The quality may be evaluated offline relative to the vehicle, or online when the vehicle is driving, or both. Evaluating the quality may comprise computing a quality based on one or more of the following factors: the emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope. One or more of the factors may be represented by numerical values; each of the numerical values may be mapped to a pre-defined range. Computing the quality may comprise assigning weights to one or more of the factors. The weights may be determined based on one or more of the following: features of the request, a type of the vehicle, a regulation, a degree of urgency, and an expected stopping time interval.

Implementations may include ignoring a target location based on its quality value or information specifying its exclusion, or classifying target locations in quality categories, or both.

Implementations of analyzing data may comprise applying a minimum quality threshold to identify one or more acceptable target locations. Computing the minimum quality threshold may be based on one or more of the following: a degree of urgency, an expected stopping time interval, and a conflicting rule.

Implementations of analyzing data may comprise identifying a region for choosing a target location. The region may comprise a drivable area or a non-drivable area or both. The region may comprise an area faced by a forward-facing side of the vehicle. The region may comprise a shape or a size or both. Determining the shape or the size may be based on a traffic condition or on a degree of urgency or on both. Determining the region may be based on qualities of one or more target locations. In some embodiments, expanding the region is performed when no target location is identified.

Implementations may include updating the region based on a new location of the vehicle.

Implementations of choosing a target location may comprise discretizing the region into potential target places, or using availability data, or both. The availability data may be acquired from one or more of the following: a crowd-sourced database, a sensor, a perception process, a historical database, a parking lot database, a parking space database, the vehicle, and another vehicle.

In general, in an aspect, implementations include a planning process associated with a vehicle driving on a road network, the planning process comprising (a) by computer receiving an input signal representing a request for the vehicle to engage in a speed-reducing safety maneuver, (b) analyzing data to update a target location and a trajectory to the target location, (c) providing output signals to control the vehicle to move to the target location, and (d) repeating (a), (b), and (c) until the vehicle reaches the target location. The target location may comprise a target stopping place. The speed-reducing maneuver may comprise stopping the vehicle.

Receiving the input signal may be based on a request from an occupant, a teleoperator, or a software or hardware process. Receiving the input signal may comprise receiving at least some of the data from a user interface in the vehicle resulting from an interaction by an occupant of the vehicle. The user interface may comprise a button, a switch, a pull-cord, a pedal, a pad, a sensor, a whistle, a display, or a voice assistant, or a combination of two or more of them. Receiving the input signal may comprise receiving a command from the teleoperator via telecommunications. The input signal may be initiated from the software or hardware process based on degradation in performance of the vehicle. The degradation in performance may comprise degradation in performance of a sensor or a component of the vehicle. The input signal may be initiated from detection of an event on the road network.

Implementations may include data comprising a degree of urgency. The degree of urgency may have been indicated by an initiator of the input signal. Implementations may include inferring the degree of urgency by an algorithmic analysis on the input signal. The algorithmic analysis may comprise analysis of a frequency, a volume, a sound, a voice, or a type, or two or more of them, of an oral request.

Implementations may include data comprising an expected stopping time interval. The expected stopping time interval may have been indicated by an initiator of the input signal, or may be inferred by an algorithmic analysis of the input signal, or both. The algorithmic analysis may comprise an analysis of data associated with the input signal.

Implementations may include data comprising traffic data, sensor data, or map data, or two or more of them.

Implementations may include analyzing the data comprises evaluating quality of one or more target locations. The quality may be evaluated offline relative to the vehicle, or online when the vehicle is driving, or both. Evaluating the quality may comprise computing a quality based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope. One or more of the factors can be represented by numerical values; each of the numerical values may be mapped to a pre-defined range. Computing the quality may comprise assigning weights to one or more of the factors. The weights may be based on one or more of the following: features of the request, a type of the vehicle, a regulation, a degree of urgency, and an expected stopping time interval.

Implementations may include ignoring a target location based on its quality value or information specifying its exclusion, or classifying target locations in quality categories, or both.

Implementations of analyzing the data may comprise applying a minimum quality threshold to identify one or more acceptable target locations. Computing the minimum quality threshold may be based on one or more of the following: a degree of urgency, an expected stopping time interval, and a conflicting rule. Analyzing the data may comprise identifying a region for choosing a target location. The region may comprise a drivable area or a non-drivable area or both. The region may comprise an area faced by a forward-facing side of the vehicle. The region may comprise a shape or a size or both. Determining the shape or the size may be based on a traffic condition or on a degree of urgency or on both. Determining the region may be based on qualities of one or more target locations.

Implementations may include expanding the region when no target location is identified, or updating the region based on a new location of the vehicle, or both.

Implementations of choosing a target location may comprise discretizing the region into potential target places, or using availability data, or both. The availability data may be acquired from one or more of the following: a crowd-sourced database, a sensor, a perception process, a historical database, a parking lot database, a parking space database, the vehicle, and another vehicle.

In general, in an aspect, technologies cause a vehicle to drive autonomously on a trajectory through a road network to a goal location based on an automatic process for planning the trajectory without human intervention, and cause the automatic process to alter the planning of the trajectory to reach a target location based on a request received from an occupant of the vehicle to engage in a speed-reducing maneuver. The target location may comprise a target stopping place. The speed-reducing maneuver may comprise stopping the vehicle. The request may comprise data received from a user interface in the vehicle as a result of an interaction by the occupant, and the user interface comprises a button, a switch, a pull-cord, a pedal, a pad, a sensor, a whistle, a display, or a voice assistant, or a combination of two or more of them.

Implementations may include data comprising a degree of urgency. In some cases, the degree of urgency is inferred by an algorithmic analysis. The algorithmic analysis may comprise analysis of a frequency, a volume, a sound, a voice, or a type, or two or more of them, of an oral request.

Implementations may include data comprising an expected stopping time interval. The expected stopping time interval may have been indicated by the occupant, or inferred by an algorithmic analysis on the request.

Implementations may include analyzing additional data comprising traffic data, sensor data, or map data, or two or more of them. Analyzing the additional data may comprise evaluating quality of one or more target locations. The quality may be evaluated offline relative to the vehicle, or online when the vehicle is driving, or both. Evaluating the quality may comprise computing a quality based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope. One or more of the factors may be represented by numerical values; each of the numerical values may be mapped to a pre-defined range. Computing the quality may comprise assigning weights to one or more of the factors. The weights may be determined based on one or more of the following: features of the request, a type of the vehicle, a regulation, a degree of urgency, and an expected stopping time interval.

Implementations may include ignoring a target location based on its quality or information specifying its exclusion, or classifying target locations in quality categories, or both.

Analyzing the additional data may comprise applying a minimum quality threshold to identify one or more acceptable target locations. Computing the minimum quality threshold may be based on one or more of the following: a degree of urgency, an expected stopping time interval, and a conflicting rule. Implementations may include identifying a region potentially comprising a target location. The region may comprise a drivable area or a non-drivable area or both. The region may comprise an area faced by a forward-facing side of the vehicle. The region may comprise a shape or a size or both. Determining the shape or the size may be based on a traffic condition or on a degree of urgency or on both. Determining the region may be based on qualities of one or more target locations. Implementations may expand the region when no target location is identified, or update the region based on a new location of the vehicle, or both.

Implementations of choosing a target location in the region include discretizing the region into potential target places, or using availability data, or both. The availability data may be acquired from one or more of the following: a crowd-sourced database, a sensor, a perception process, a historical database, a parking lot database, a parking space database, the vehicle, and another vehicle.

In general, in an aspect, technologies include an autonomous vehicle comprising: (a) steering, acceleration, and deceleration devices that respond to signals from a driving control system to drive the vehicle autonomously on a road network; (b) a receiving device on the vehicle that receives a request signal for the vehicle to engage in a speed-reducing safety maneuver and causes the driving control system to analyze data and choose a target location for the maneuver; and (c) a communication element that sends signals indicative of commands to the driving control system for the steering, acceleration, and deceleration devices to cause the vehicle to drive to and execute the maneuver at the target location. The target location may comprise a target stopping place. The speed-reducing maneuver may comprise stopping the vehicle.

In some implementations, the request may be received from an occupant, a teleoperator, or a software or hardware process. The request signal may comprise data received from a user interface in the vehicle resulting from an interaction by an occupant of the vehicle. The interface may comprise a button, a switch, a pull-cord, a pedal, a pad, a sensor, a whistle, a display, or a voice assistant, or a combination of two or more of them. Receiving the request signal may comprise receiving a command from the teleoperator via telecommunications. The request signal may be initiated by a software or hardware process based on degradation in performance of the vehicle. The degradation in performance may comprise degradation in performance of a sensor or a component of the vehicle. The request signal may be initiated by detection of an event on the road network.

Implementations may include data comprising a degree of urgency. The degree of urgency may have been indicated by an initiator of the request. The driving control system may infer the degree of urgency by an algorithmic analysis of the request. The algorithmic analysis may comprise analysis of a frequency, a volume, a sound, a voice, or a type, or two or more of them, of an oral request.

Implementations may include data comprising an expected stopping time interval. The expected stopping time interval may have been indicated by an initiator of the request, or may be inferred by an algorithmic analysis on the request, or both.

In some implementations, the data may comprise traffic data, sensor data, or map data, or two or more of them. Analyzing the data may comprise evaluating quality of one or more target locations. The quality may be evaluated offline relative to the vehicle, or online when the vehicle is driving, or both.

Implementation of evaluating the quality may be based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope. One or more of the factors may be represented by numerical values. Each of the numerical values can be mapped to a pre-defined range. Computing of the quality may comprise assigning weights to one or more of the factors. The weights may be based on one or more of the following: features of the request signal, a type of the vehicle, a regulation, a degree of urgency, and an expected stopping time interval.

In some implementations, the driving control system may ignore a target location based on its quality value or information specifying its exclusion, or classify target locations in quality categories, or both. Analyzing the data may comprise applying a minimum quality threshold to identify one or more acceptable target locations. The driving control system may compute the minimum quality threshold based on one or more of the following: a degree of urgency, an expected stopping time interval, and a conflicting rule.

Analyzing the data may comprise identifying a region potentially comprising a target location. The region may comprise a drivable area or a non-drivable area or both. The region may comprise an area faced by a forward-facing side of the vehicle. The region may comprise a shape or a size or both. The driving control system may determine the shape or the size based on a traffic condition or on a degree of urgency or on both. The driving control system may determine the region based on qualities of one or more target locations. In some implementations, the driving control system may expand the region when no target location is identified, or update the region based on a new location of the vehicle, or both.

In some implementations, the driving control system may choose a target location by discretizing the region into potential target places, or by using availability data, or both. The availability data may be from one or more of the following: a crowd-sourced database, a sensor, a perception process, a historical database, a parking lot database, a parking space database, the vehicle, and another vehicle.

In general, in an aspect, implementations include an apparatus comprising a user interface device, located in an autonomous vehicle and comprising a processor and a memory, configured to expose to an occupant of the vehicle (a) input features that enable the occupant to express a request signal for the vehicle to engage in a speed-reducing maneuver, and (b) output features that report to the occupant a status of the maneuver. The speed-reducing maneuver may comprise stopping the vehicle. The input features, in part or in a whole, may be shielded by a removable or breakable medium. The input features may comprise a button, a switch, a pull-cord, a pedal, a pad, a sensor, a whistle, a display, or a voice assistant, or a combination of two or more of them. The voice assistant may comprise a natural language processing module. The natural language processing module may infer a degree of urgency.

The input features may enable the occupant to identify a target location. The input features may enable the occupant to express a degree of urgency, an expected stopping time interval, or both. The degree of urgency may be determined based on a length of a press, or the number of presses, or both. The processor may infer a degree of urgency by an algorithmic analysis. The algorithmic analysis may comprise analysis of a frequency, a volume, a sound, a voice, a type, or words, or two or more of them, of an oral request. The algorithmic analysis may be based on an estimated time till reaching a stop, or an estimated distance till reaching a stop, or both. The processor may infer an expected stopping time interval by an algorithmic analysis.

Implementations may include the processor to identify a region potentially for the speed-reducing maneuver. The output features may report the region comprising information related to a target location, the information comprising one or more of the following: a shape, a size, a quality, and an estimated time till reaching the target location. The input features may allow the occupant to expand the region when no target location is identified, or to lower a quality threshold, or both. The output features may report a trajectory towards a target location.

The output features or the input features or both may function based on visual communications or aural communications or both.

Implementations of reporting to the occupant may be realized on a personal device of the occupant.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 1:
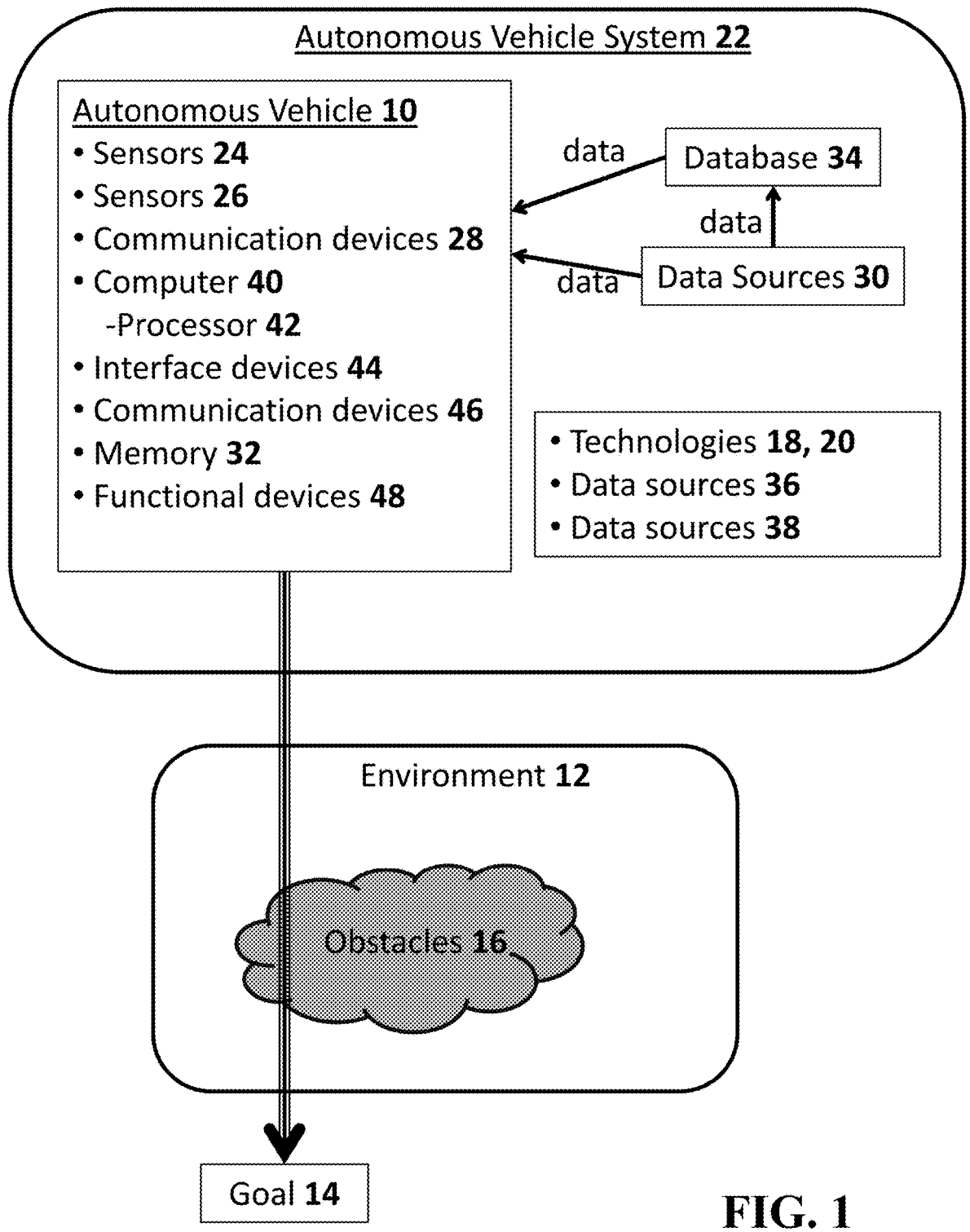
FIG. 1 is a block diagram of an AV system.

With respect to terminology, in this document:

The term "autonomous vehicle" (AV) is used broadly to include any vehicle that has autonomous driving capability or a semi-autonomous driving capability or a machine assisted manual driving capability. An AV can drive in an autonomous mode or a human-operated mode or a semi-autonomous mode or a combination of them, e.g., a human-guided autonomous mode or a machine-assisted manual mode. We also sometimes use the term "autonomous vehicle system" or "AV system" to refer to the AV and other components (which may be located remotely) associated with the operation of an AV. We sometimes use the terms AV and AV system interchangeably.

The term "stop" is used broadly to include any cessation of motion (e.g., stop, park, or stand), or reduction of the moving speed of a vehicle to a very slow speed and getting off the road.

The term "teleoperator" is used broadly to include any person or any software process or hardware device remote to an AV which has been enabled to affect the operation of the AV. Through telecommunications, the teleoperator is able to interact with the AV or the AV system, or issue commands to the AV or AV system, or both.

The term "degree of urgency" is used broadly to include any estimate of a limitation applicable to the stopping of the AV, for example, any quantitative estimate of a time or distance or both within which an AV is to stop.

The term "stop request" is used broadly to include any signal, request, instruction, command, suggestion, or other indication of any kind, or a combination of two or more of them, to an AV or an AV system to stop the AV. The indication may be provided by a person including an occupant, or a non-occupant, or a hardware component onboard or offboard the AV, or a software process running onboard or offboard the AV, or a combination of two or more of them. A stop request may comprise, or be associated with any combination of one or more of: a degree of urgency, an expected stopping time interval, an expected stopping distance, or other factors.

The term "expected stopping time interval" is used broadly to include any estimated quantity that is indicative of how long (e.g., in minutes, hours or days) an AV is to remain stopped at a stopping place.

The term "stopping place" is used broadly to include any area that a vehicle occupies when it is not moving. A stopping place may be identified by a shape (e.g., a rectangle) at a location in the world. A stopping place may include a direction in which an AV may be facing.

The phrase "quality of a stopping place" is used broadly to include any quantity (e.g., an estimated quantity) associated with a stopping place based on one or more of the following criteria: acceptability, desirability, value, risk, benefit, or other indicator, or combinations of them, of the stopping place.

The term "acceptable stopping place" is used broadly to include any stopping place for which the quality of the stopping place meets or exceeds a threshold.

The term "available stopping place" is used broadly to include any stopping place (including any acceptable stopping place) that an AV can reach and stop at.

The term "target stopping place" is used broadly to include any stopping place that is currently selected by an AV system to navigate to and stop at.

The term "proximity region" is used broadly to include a region in the vicinity of an AV.

The term "goal region" is used broadly to include any union or other set of acceptable stopping places that lie within a proximity region.

The term "availability layer" is used broadly to include information associated with map data for identifying available stopping places. An available stopping place may or may not be an acceptable stopping place.

The term "trajectory" is used broadly to include any path or route from one place to another, for example, a path from a pickup location to a drop off location.

The technologies described in this document are applicable, for example, to semi-autonomous vehicles, such as so-called Level 2 and Level 3 vehicles (see SAE International's standard J3016: Taxonomy and Definitions for Terms Related to On-Road Motor Vehicle Automated Driving Systems, which is incorporated by reference in its entirety, for more details on the classification of levels of autonomy in vehicles) which attempt to control the steering or speed or both of a vehicle. The Level 2 and Level 3 systems may automate certain vehicle operations, such as steering and braking, under certain driving conditions based on analysis of sensor inputs. Level 2 and Level 3 systems in the market typically reason about obstacles that are directly perceived by vehicle sensors during the decision-making process. The technologies described in this document can benefit the semi-autonomous vehicles. Further, the technologies described in this document also can assist driving decisions of human-operated vehicles.

AVs

As shown in FIG. 1, a typical activity of an AV 10 is to safely and reliably drive autonomously through an environment 12 to a goal location 14, while avoiding vehicles, pedestrians, cyclists, and other obstacles 16 and obeying rules of the road (e.g., rules of operation or driving preferences). The AV's ability to perform this activity often is referred to as an autonomous driving capability.

The autonomous driving capability of an AV typically is supported by an array of technologies 18 and 20 (e.g., hardware, software, and stored and real time data) that this document together sometimes refers to (together with the AV) as an AV system 22. In some implementations, one or some or all of the technologies are onboard the AV. In some cases, one or some or all of the technologies are at another location such as at a server (e.g., in a cloud computing infrastructure). Components of an AV system can include one or more or all of the following (among others).

1. Memory 32 for storing machine instructions and various types of data.
2. One or more sensors 24 for measuring or inferring or both properties of the AV's state and condition, such as the vehicle's position, linear and angular velocity and acceleration, and heading (e.g., orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
3. One or more sensors 26 for measuring properties of the AV's environment. For example, such sensors can include, but are not limited to: LIDAR; RADAR; monocular or stereo video cameras in the visible light, infrared and/or thermal spectra; ultrasonic sensors; time-of-flight (TOF) depth sensors; and temperature and rain sensors.
4. One or more devices 28 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I)

communication devices, and devices for wireless communications over point-to-point or ad-hoc networks or both. The devices can operate across the electromagnetic spectrum (including radio and optical communications) or other media (e.g., acoustic communications).

5. One or more data sources 30 for providing historical, or real-time, or predictive information, or a combination of any two or more of them about the environment 12, including, for example, traffic congestion updates and weather conditions. Such data may be stored on a memory storage unit 32 on the vehicle or transmitted to the vehicle via wireless communications from a remote database 34.

6. One or more data sources 36 for providing digital road map data drawn from GIS databases, potentially including one or more of the following: high-precision maps of the roadway geometric properties; maps describing road network connectivity properties; maps describing roadway physical properties (such as the number of vehicular and cyclist traffic lanes, lane width, lane traffic direction, lane marker type and location); and maps describing the spatial locations of road features such as crosswalks, traffic signs of various types (e.g., stop, yield) and traffic signals of various types (e.g., red-yellow-green indicators, flashing yellow or red indicators, right or left turn arrows). Such data may be stored on a memory storage unit 32 on the AV, or transmitted to the AV by wireless communication from a remotely located database, or a combination of the two.

7. One or more data sources 38 for providing historical information about driving properties (e.g., typical speed and acceleration profiles) of vehicles that have previously traveled along local road sections at similar times of day. Such data may be stored on a memory storage unit 32 on the AV, or transmitted to the AV by wireless communication from a remotely located database 34, or a combination of the two.

8. One or more computer systems 40 located on the AV for executing algorithms (e.g., processes 42) for the on-line (that is, real-time on board) generation of control actions based on both real-time sensor data and prior information, allowing an AV to execute its autonomous driving capability.

9. One or more interface devices 44 (e.g., displays, mouses, track points, keyboards, touchscreens, speakers, biometric readers, and gesture readers) coupled to the computer system 40 for providing information and alerts of various types to, and to receive input from, occupants of the AV. The coupling may be wireless or wired. Any two or more of the interface devices may be integrated into a single one.

10. One or more wireless communication devices 46 for transmitting data from a remotely located database 34 to the AV and to transmit vehicle sensor data or data related to driving performance to a remotely located database 34.

11. Functional devices and AV features 48 that are instrumented to receive and act on commands for driving (e.g., steering, acceleration, deceleration, gear selection) and for auxiliary functions (e.g., turn indicator activation) from the computer system.

Stop Requests

Stop requests for AVs can involve, or comprise, a variety of causes for stopping, urgencies of stopping, and modes of stopping, such as the following:

1. An occupant of the AV feels uncomfortable, for example, because of an unstable driving behavior of the AV system or because the occupant is feeling sick and wants the AV to come to a stop.
2. An occupant has a change in his travel plan and wants to promptly exit the AV.
3. A monitoring process of the AV system detects a fault or a failure in one or more components in the AV or the AV system (e.g., vehicular components, sensors, batteries, computers, software processes, or communication devices, or combinations of them), and determines that the AV must stop.
4. A central server of the AV system directs that the current goal location is no longer relevant. For example, an AV is travelling to service a pick-up request from a user, but the pick-up request is cancelled, and the central server directs the AV system to stop.
5. An occupant or a teleoperator may wish to shift the AV from an autonomous mode to a manual mode or a semi-autonomous mode, which may require the AV first to stop.
6. The AV system detects or receives information about the presence of an emergency vehicle, and determines the AV to stop, potentially until the detected emergency vehicle passes.
7. The AV system detects a road blockage or a similar incident and determines that the AV must stop.
8. A traffic officer or a police officer requests or directs the AV to stop.

An initiator of a stop request may be an occupant, a police officer, a traffic officer, the AV system, a software process, a central server, a teleoperator, or any other kind of source of a stop request, or a combination of two or more of them. The initiator may provide information related to the stop request; for example, a risky event (e.g., a fire, a protest, a bomb threat, or a hardware failure) is emerging in the AV or in neighborhood proximity region of the AV, so a teleoperator provides information (e.g., a location, a happening time, and a description) related to the risky event and issues a stop request to take over the AV system in a manual mode.

When a stop request is initiated, a signal is issued to the AV system; the AV system then accepts, processes, and responds to the signal. Among other things, the AV system evaluates, for example, features of the request (e.g., a request type, a way of the request being made, and a frequency of the request), a degree of urgency, a road environment, an expected stopping time interval, map data, sensor data, or a combination of two or more of them or other factors, to identify a target stopping place for the AV. The AV continuously updates a target stopping place in its proximity region and a trajectory to the target stopping place until the AV reaches a safe stopping place.

Degrees of Urgency

Stop requests have different degrees of urgency. For instance, in the event of a serious system degradation, fault, or traffic accident, the AV may need to be stopped as rapidly as possible. Such a request therefore has a high degree of urgency. On the other hand, if the AV system's current goal location is determined by a central server to be no longer relevant, and the central server cannot immediately assign another goal location to the AV system, the AV system may treat the stop request as having a low degree of urgency.

The degree of urgency may be associated with the stop request. The urgency degree may be determined by the AV system, a central server, a teleoperator, an occupant in the AV, a software process, another kind of source, or a combination of two or more of them. In the event of a degradation of the AV system performance which leads to a system-initiated stop request, the AV system may determine the degree of urgency based on the level of degradation, as specified in pre-defined rules. For instance, failures in critical sensors or computing hardware may result in a stop request with a high degree of urgency. In another example, a minor malfunction in a sensor that is not safety-critical can result in a stop request with a low degree of urgency.

The degree of urgency may influence the choice of a target stopping place. If the stop request has a high degree of urgency, it may be important to rapidly find a target stopping place. On the other hand, if the stop request has a low degree of urgency, it may be appropriate to search for a target stopping place with a higher quality, even if the search takes a longer time. A degree of urgency can be represented by a number (e.g., on a scale from 1-10, with 10 being the most urgent) or a category (e.g., low, medium and high), or in various other ways that permit decision-making during the stopping process.

Figure 2:
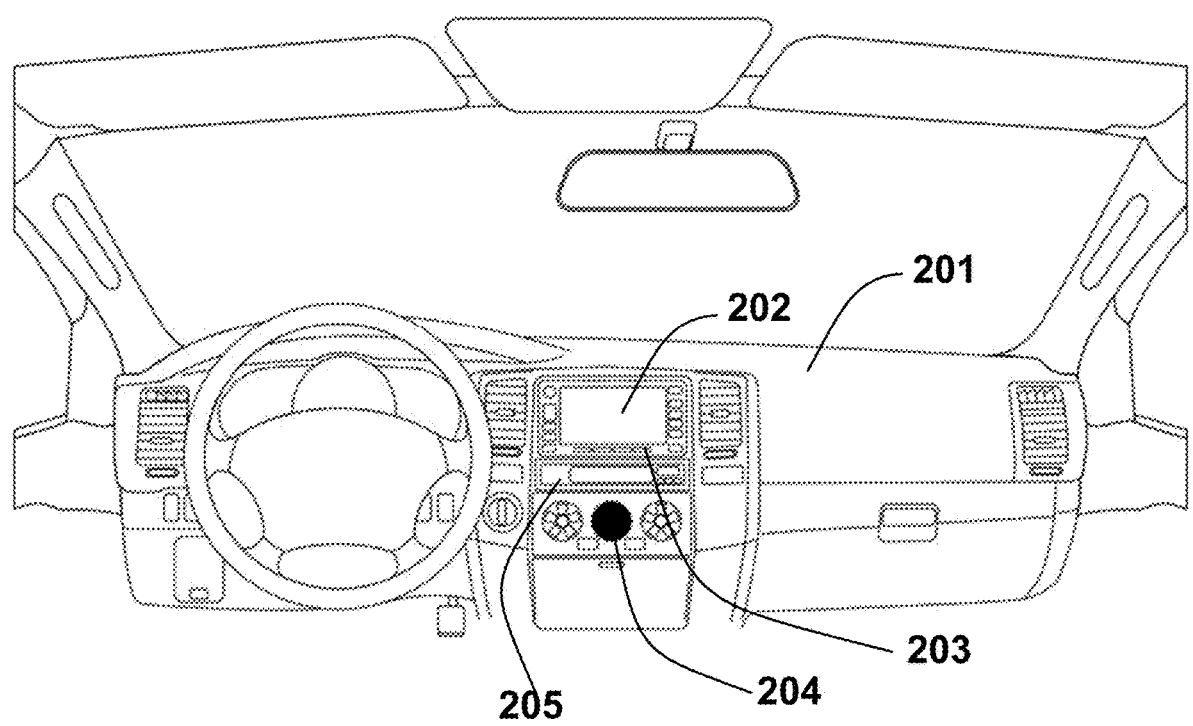
FIGS. 2 and 3 show user interfaces.

An AV system may comprise one or more devices that enable an occupant to initiate a stop request, e.g., a button, a switch, a pull-cord, a pedal, a pad, a sensor, a whistle, or a touchscreen, or combinations of them, among others. The initiation of the stop request causes a signal to be sent to the AV system. Depending on the mode and manner in which the stop request is initiated (as discussed below) the signal can carry information in addition to a simple indication to stop. FIG. 2 illustrates an exemplary user interface. An occupant of the AV can initiate a stop request by pressing a button 204 that is integrated into the dashboard 201 of the AV. The button may be a physical button or a virtual button presented on a touchscreen 202. The physical button may be shielded by a removable or breakable medium, to reduce the likelihood that an accidental button press leads to the AV coming to a stop. In some implementations, the button 204 may be used to initiate a stop request for an immediate emergency stop only.

In some cases, the way of interacting with the button 204 represents a degree of urgency; for example, long pressing (e.g., pressing and holding for a specified time) or double pressing or multiple pressing or combinations of them indicate an increasing degree of urgency of the stop request.

In some applications, requiring multiple presses of the button 204 may reduce the likelihood that an accidental button press is interpreted incorrectly as a stop request causing the AV to stop.

In some implementations, the AV system includes two or more buttons, which represent different degrees of urgency. For example, one button initiates a highly urgent emergency stop request and is therefore physically shielded, and another initiates a relatively less urgent stop request and is not physically shielded.

In FIG. 2, the dashboard 201 may comprise one or more sensors 203, e.g., a microphone, and a speaker for voice-based communication. A microphone may feed its signals into an audio device 205 with a voice assistant process. The voice assistant process may employ a combination of noise-cancellation, voice processing, machine learning and natural language processing technologies to interpret sounds or voices emitted by an occupant and take actions accordingly. For example, the voice assistant may constantly monitor the signals from the microphone array to detect the phrase "stop the car", or "stop", or a variety of other phrases related to possible stop requests. The degree of urgency may be determined or inferred from the phrases—for example, the phrase "stop now" may be programmed to be interpreted as a stop request with a higher degree of urgency than the word "stop". The degree of urgency may be determined by a machine learning algorithm that attempts to infer the urgency based on voice features of the occupant, such as volume or pitch or both. The degree of urgency may be determined by pre-specified rules. The degree of urgency may be increased if the occupant, before the car comes to a stop, utters more phrases, for example "stop the car now". The stop request may be cancelled if the occupant, before the car comes to a stop, utters a phrase such as "don't stop". In some implementations, the voice assistant may request the occupant to provide a confirmation, in the form of another voice command or other interaction (e.g., a button press), before initiating action in response to the stop request.

Figure 3:
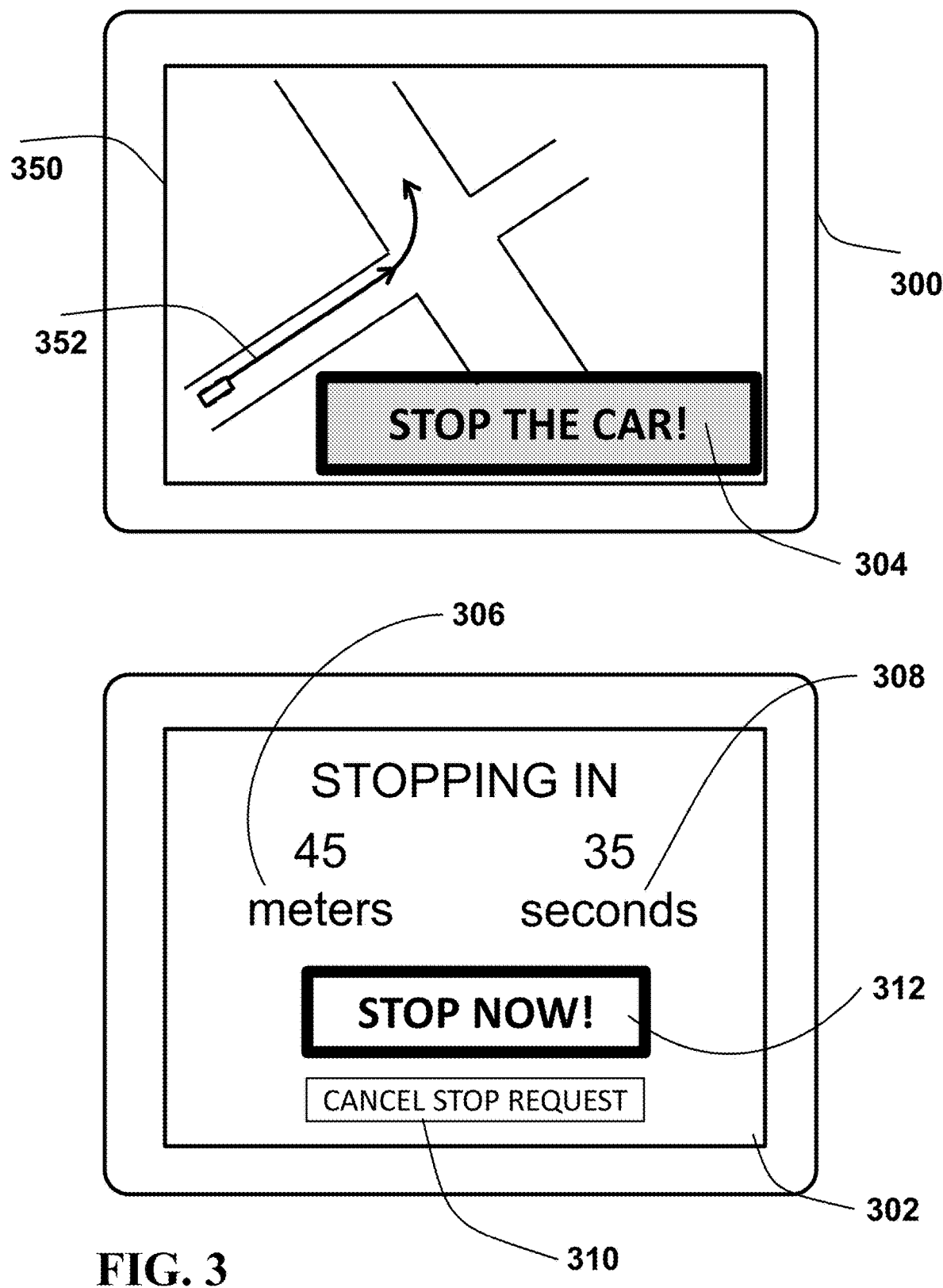

FIG. 3 shows an exemplary touchscreen display 301. The display can be mounted, for example, on the dashboard or seat back (e.g., behind the headrest of a seat). The display 301 may present an element, such as the button 304, that is potentially always visible and allows an occupant to initiate a stop request. In some implementations, the display 302 may then show an estimated distance 306 and time 308 until the AV stops. The display may also a show a map view 350 that portrays the trajectory 352 from the AV's current location to a target stopping place selected by the AV system. An element, such as the button "STOP NOW!" 312, may be displayed after the occupant has pressed the STOP THE CAR button 304, allowing the occupant to change the degree of urgency of a pending stop request. Pressing the "STOP NOW!" button 312 may increase the degree of urgency from "medium" to "high". An element, such as the button 310, may allow an occupant to cancel the stop request. The AV system may then acknowledge the cancel stop request command back to the occupant.

In some implementations, an occupant of an AV who initiates a stop request may specify explicitly or implicitly a degree of urgency of the stop request. Examples of the specification include: "high", "medium" or "low" degree of urgency; stop within 10 seconds, 30 seconds or 2 minutes; stop within 50 meters, 100 meters or 500 meters.

In some implementations, even if the stop request is not initiated through the display 301 but, for example, by the AV system or a teleoperator or a voice command or a physical button, the screen 302 may show the distance and time to the stopping place, or the trajectory from the AV's current location to the target stopping place, or both.

In some implementations, speakers of the AV system may be used to give the occupant aural feedback in the event of a stop request, such as the estimated time and distance before the AV stops, or instructions for how to stop the car more quickly, or both.

Expected Stopping Time Interval

In addition to a degree of urgency, a stop request may comprise information related to an expected stopping time interval at which the AV will remain in a stopped status. The expected stopping time interval may be determined by the AV system independently, or potentially in conjunction with a central server, a system user, a teleoperator, an occupant, or combinations of them. In some implementations, the expected stopping time interval is determined by analyzing an initiator of the stop request. The determination may be based on predefined rules, formulae, algorithms, user inputs (e.g., from a system user, a teleoperator or an occupant), predefined processes, or a combination of two or more of them. For example, if a stop request was initiated by a teleoperator to transition the AV from a manual mode to an autonomous mode, the expected stopping time interval may be short. In another example, a stop request initiated due to a sensor failure may result in a long (or indeterminately long) stopping time interval, since the AV may need to await transport from a tow truck.

In some implementations, the interior of the AV may comprise a user interface feature (e.g., a button, a touchscreen, or a voice assistant process, or a combination of two or more of them) allowing an occupant to specify an expected stopping time interval of the stop request. Similarly, a teleoperation system may comprise a user interface used by a teleoperator to specify a degree of urgency or an expected stopping time interval or both associated with the stop request.

The expected stopping time interval may influence the choice of a stopping place, as there may be locations that are suitable for a very short stop but are unsuitable for longer stops. The expected stopping time interval may be represented as a specified time duration (e.g., up to or at least 30 seconds, 1 minute, 5 minutes, 10 minutes, 30 minutes, 60 minutes, 2 hours, 3 hours, 6 hours, 12 hours, or 24 hours), or in ordered categories (e.g., "brief", "moderate" and "long"), or in various other ways that permit decision making. When a stop request is initiated and the degree of urgency and the expected stopping time interval are provided, the AV system may analyze the degree of urgency and the expected stopping time interval to determine an acceptable target stopping place and then stop there.

Quality of a Stopping Place

A stopping place may be identified by the AV system using a shape (e.g., a rectangle or an oval) at a location in the world. The shape of the stopping place may be defined to match the footprint of the AV (including buffers on every side to account for overhangs or for safety purposes).

Figure 4:
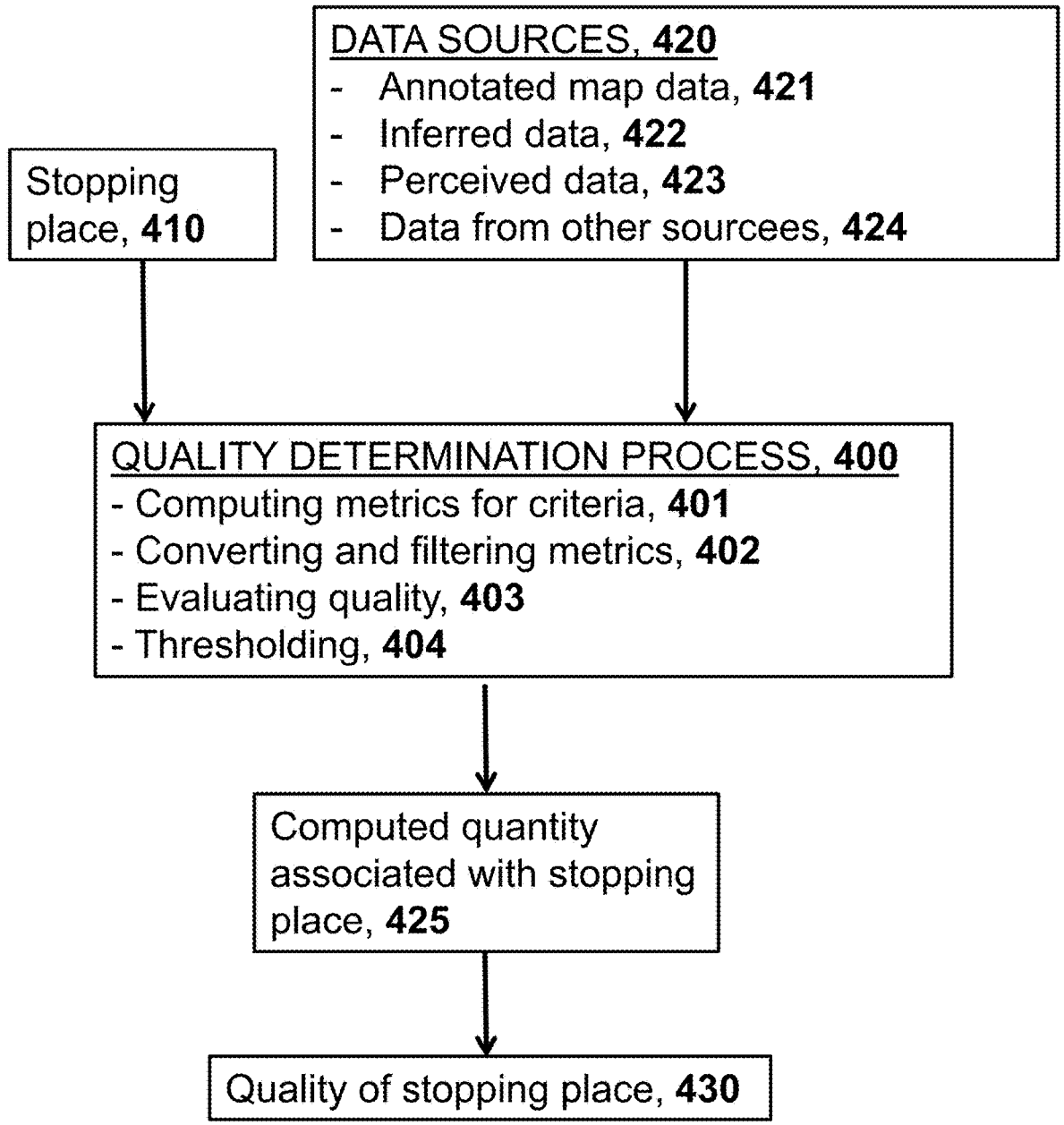
FIG. 4 is a flow diagram of a quality determination process.

FIG. 4 shows a process of evaluating quality of a stopping place. The quality of a stopping place 430 is a computed quantity 425 associated with a stopping place 410. The quality determination process 400 relies on analysis of one or more criteria for evaluating the quality of the stopping place 410 to serve a stop request. Examples of the criteria include the following:

1. Designated stopping place. Examples of designated stopping places include parking spots, parking lots, truck stopping zones, or road shoulders, which are intended as places for vehicles to stop. Other examples include a stopping place located in a travel lane or bus lane or bike lane, where it may be acceptable to stop in the event of an emergency, but not otherwise. This information may be encoded in map data.
2. Travel speed. If a target stopping place is on a travel lane or next to a travel lane, a lower speed environment is usually preferable than a higher speed environment. The determination of a travel speed can be based on one or more of the following: a speed limit on the road segment, an average speed of vehicles currently on the road segment as measured by the AV system, statistical measures from a data source, and annotated map data onboard or offboard the AV.
3. Traffic volume. If a target stopping place is on a travel land or next to a travel lane, a lower traffic density environment is usually preferable to a higher traffic environment. Traffic density may be determined based on one or more of the following: an average density or flow of vehicles currently on the road segment as measured by the AV system, statistical measures from a data source, and annotated map data onboard or offboard the AV.
4. Traffic composition. If a target stopping place is on a travel lane or next to a travel lane, it may be preferable to avoid areas based on a composition of the traffic, such as traffic that includes a large number of heavy vehicles. The traffic composition may be determined based on one or more of the following: an average density or flow of heavy vehicles currently on the road segment as measured by the AV system, statistical measures from a data source, and annotated map data onboard or offboard the AV.
5. Choice of lane. If a stopping place is in a travel lane, it is generally preferable to stop in the lane that is closest to the edge of the road, compared to a lane in the middle of the road.
6. Degree of blockage. This is a measure of how much maneuvering would be required by other vehicles and other road users to avoid hitting the AV, if the AV system decides to stop at a particular target stopping place. In designated stopping places, such as parking lots and shoulders, the AV is likely to present no obstruction to other vehicles. For a stopping place at the edge of a road, where part of the stopping place is on a travel lane and part of the AV is outside a travel lane, other vehicles might require slight maneuvering (e.g., swerving) to avoid hitting the AV. If the AV system chooses to stop in the middle of a traffic lane, other vehicles would have to maneuver significantly (e.g., shift lanes) in order to avoid the AV. The degree of blockage may be represented, for example, as a fraction of a travel lane that is blocked by the stopped AV. A numerical value may be used; for example, a value of 0 indicates no blockage, 0.5 indicates that half a lane is blocked, 1 indicates that a full travel lane is blocked, and 1.5 indicates that 1.5 lanes are blocked.
7. Sightlines from other vehicles. If a target stopping place is a location where other vehicles would need to maneuver in order to avoid the stopped AV, it is preferable to stop in a location where the stopped AV is visible to other vehicles. For example, it is generally preferable to stop on a long straight road segment, as opposed to stopping on a curved road segment, or a steeply inclined road segment. This may be represented, for example, by a measure of the curvature of the road segment at that stopping place, with lower curvatures being preferable to higher curvatures. The curvature of the road segment may be measured or read from the map data.
8. Distance from intersections. It is generally preferable for an AV to stop further away, rather than closer to, intersections, freeway ramps, railroad crossings, pedestrian crossings, or traffic lights, where the stopping place may cause traffic blockage or traffic congestion or a potential safety hazard for other road users. The distance measure may be represented, for instance, by a distance from the target stopping place to the closest relevant intersection or crossing. The distance measure may be calculated from map data or from sensor data.
9. Presence of dedicated lanes. Some areas dedicate one or more lanes of a road to buses or bicycles only. Depending on the local traffic regulations, stopping a vehicle on a dedicated lane may violate the regulations or may be acceptable in case of emergencies. The data of dedicated lanes and traffic regulations can be acquired from map data or from a data provider.
10. Terrain. It is generally preferable to stop on a concrete or asphalt surface than on a gravel, mud or grass surface. The map data may include terrain data and different scores may be assigned to different types of terrain.
11. Slope of the road. It is generally preferable to stop on a flat surface or a gently sloping surface than on a steeply inclined road segment, especially when a stopping place is determined to be in a travel lane. This may be represented by the slope or gradient of a road segment, which may be recorded as part of map data.

Data about these criteria may come from a variety of data sources 420 and combinations of two or more of them, including, for example, annotated map data 421, inferred data 422 (e.g., information about a stopping place that is inferred from other data), perceived data 423 (e.g., data coming from a sensor or a perception component of the AV system, or from other vehicles, or from sensors located in the infrastructure, or a combination of two or more of them). Data may come from other data sources 424 located in a remote central server or a cloud.

The metrics of these criteria and other relevant criteria (401) may be computed as numerical numbers or ordered labels (e.g., "low," "medium," and "high"), or unordered categorical labels (e.g., "concrete surface," "asphalt surface," and "unpaved surface"), or a combination of two or more of them.

In some implementations, step 402 may be employed to convert some metrics into numbers, to facilitate ease of comparison and combination. For example, if a metric is a category, each category could be mapped to a numerical value based on predefined rules; e.g., categories comprise "low," "medium" and "high," and can be mapped to numerical values, such as, 0, 0.5 and 1, respectively. Some implementations consider metrics by numerical ranges, e.g., between 0 and 1 or between 0 and 100. Categorical metrics may be converted to numbers within a numerical range according to predefined rules. Numerical metrics can be mapped to other numbers within a numerical range; for example, mapping the smallest possible value of the metric to 0, the largest possible value to 1, and mapping all values in between using linear interpolation.

The quality of a stopping place depends on a variety of criteria. Integrating the criteria facilitates comparisons of the relative qualities of different stopping places. An example quality determination process is described below.

1. The quality determination uses utility scores to evaluate stopping places (401). The process computes a numeric utility score for each stopping place that represents the quality of the stopping place. The computations of utility scores comprise one or more of the following: converting all metrics to numbers, normalizing these numbers to lie within certain pre-defined ranges, and using pre-calibrated or pre-defined weights to account for differences in the importance of different criteria. The weights may vary based on many factors, such as, but not limited to, the initiator of the stop request, the reason of the stop request, the type of the AV, and local regulations. For example, if a stop request has been initiated because of a detected degradation in braking performance, the utility score calculation may assign a large weight to the metric representing the slope of the road segment, to indicate a strong preference for stopping places on roads that are not inclined.
2. The quality determination comprises a filtering process 402. For numerical metrics, the filtering process may set a metric with an acceptable lower bound or upper bound or both, and ignore a stopping place with the metric out of one bound or both bounds. For categorical metrics, the filtering process can create an exclusion list for a metric, and then ignore a stopping place with the metric taking a categorical value from the exclusion list. The bounds and exclusion lists may vary based on many factors, such as the source of the stop request, the initiator of the stop request, the reason of the stop request, the type of the AV and local regulations.
3. In step 403, the quality determination classifies a stopping place into a pre-defined class (e.g., excellent, good, poor, or bad) that coarsely encodes the quality of the stopping place. Then, fuzzy logic rules can be applied to compare various stopping places based on the degree to which each stopping place belongs in each class.

The quality determination can derive quality measures 403 of stopping places, compare the stopping places based on their qualities, or ignore stopping places that are below a specified minimum quality threshold 404. The quality determination process may perform computations on stopping places beforehand offline and the results may be encoded in the map data; or, it may be performed online and in real time while the AV is driving; or, it may be performed both offline and online to determine a final quality measure for each stopping place.

Determining the Minimum Quality Threshold

Figure 5:
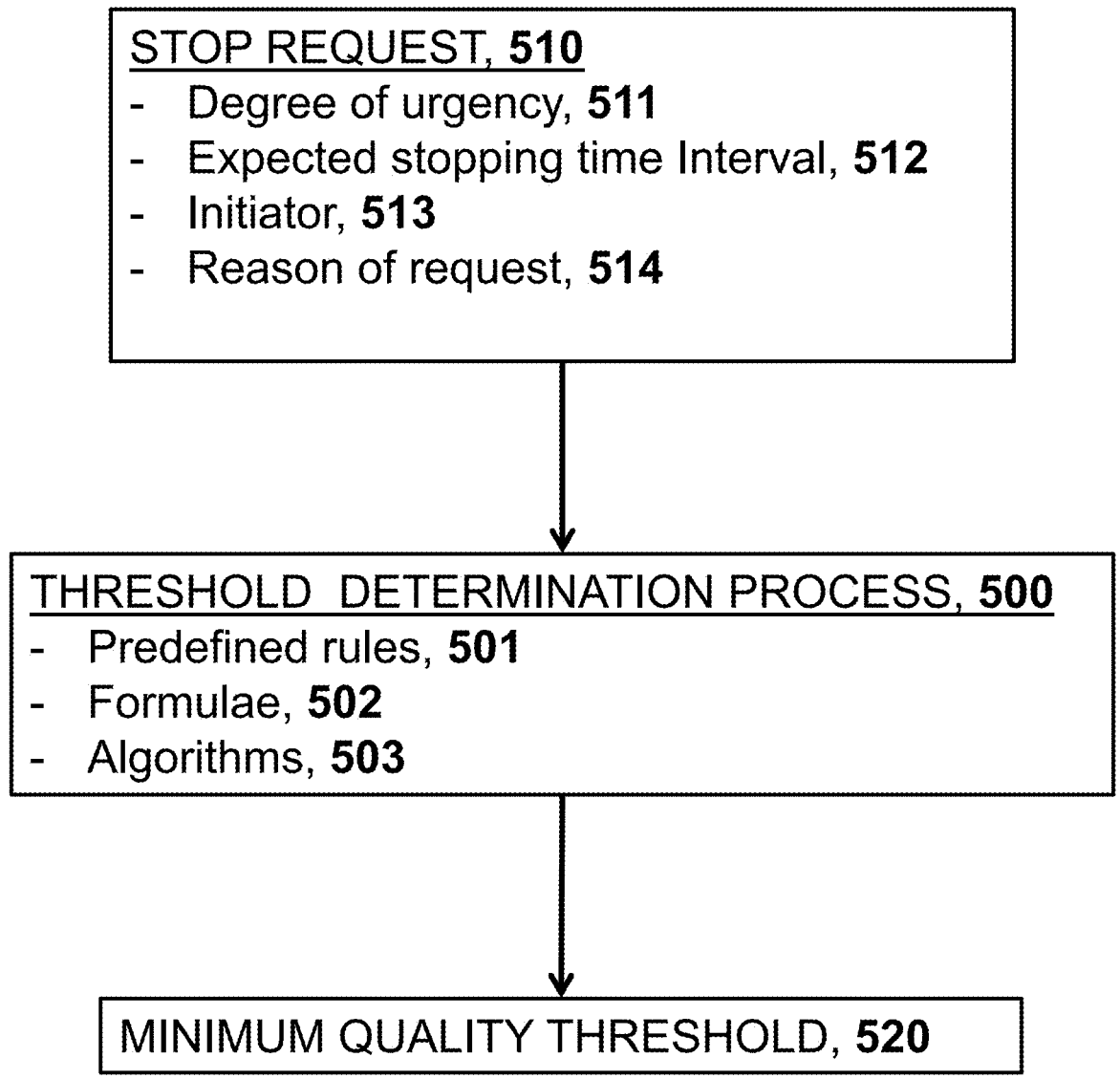
FIG. 5 is a flow diagram of a threshold determination process.

As mentioned previously, given a stop request, the AV system determines its degree of urgency and expected stopping time interval, and depending on these and other factors, computes a minimum quality threshold, as part of a threshold determination process 500 in FIG. 5. An acceptable stopping place is then to be found based on a minimum quality threshold.

If a stop request is relatively urgent, a lower quality stopping place may be acceptable than if the stop request is relatively less urgent. Therefore, a lower minimum quality threshold may be used, resulting in more acceptable stopping places being considered and increasing the chances that the vehicle may stop quickly. Conversely, less urgent stop requests will result in a higher minimum quality threshold, resulting in fewer but higher quality acceptable stopping places being considered, and consequently possibly increasing the time taken to stop.

Similarly, if an expected stopping time interval is short, a lower quality stopping place may be acceptable, and therefore a lower minimum quality threshold may be used. Conversely, if the expected stopping time interval is long, a higher quality acceptable stopping place may be desirable, and therefore a higher minimum quality threshold may be used.

As shown in FIG. 5, the threshold determination process 500 has pre-configured rules 501, formulae 502, algorithms 503, or combinations of them. The threshold determination process 500 determines the minimum quality threshold 520 for a stopping place to be considered acceptable, given one or more of the following: features of a stop request 510, an initiator 513, a reason 514 causing the stop request, a degree of urgency 511, and an expected stopping time interval 512. These rules may encode the trade-offs mentioned above. Further, the minimum quality threshold is typically restricted to stay within the range of values being output by the quality determination process, for ease of comparison. For example, if the output of the quality determination process is a numerical value within the range between 0 and 1, with 1 being the highest quality and 0 being the lowest quality, the minimum quality threshold is preferably a numerical value within the same range.

Assuming that the quality determination process represents the quality of a stopping place as a number in the range between 0 and 1, examples of rules for forming a threshold determination process include one or more of the following:

1. If the degree of urgency is a categorical metric that takes categories such as "low," "medium" and "high," then these categories may be mapped to minimum quality thresholds as 0.9, 0.5 and 0.1, respectively. The mapping can be based on a table or a defined functional relationship.
2. If the degree of urgency is a number in the range from 0 to 1, with 1 being the most urgent and 0 being the least urgent, a minimum quality may set minimum urgency degree as 0.5.
3. If an expected stopping time interval is calculated as a numerical value in time units, such as seconds or minutes or hours, then a function is used to map a range of the expected stopping time interval to a degree of urgency. For example, if the expected stopping time interval is less than 30 seconds, then the minimum quality threshold is set as 0.1; if the expected stopping time interval is between 30 seconds and 2 minutes, the minimum quality threshold is set as 0.4; if the expected stopping time interval is more than 2 minutes, the minimum quality threshold is set as 0.8.
4. If there is a conflicting rule (e.g., traffic regulations, an opposite driving direction, a peak time, a large traffic volume, or a work day) that affects the value of the minimum quality threshold, use the rule that results in the lowest value of the threshold. In practice, such rules may be created and calibrated through a number of techniques. For instance, rules may be inferred using a machine learning process that analyzes real-world driving data (including images, videos, and GPS traces), traffic data, government data, historical data, sensor data, health data, risk data, accident data, simulation data, or a combination of two or more of them.

Proximity Region and Goal Region

The proximity region of an AV is used to focus the search for acceptable stopping places, rather than spending time looking at other areas of the world that are less relevant. The proximity region is therefore a region of the map within which the AV will search for a target stopping place.

Figure 6:
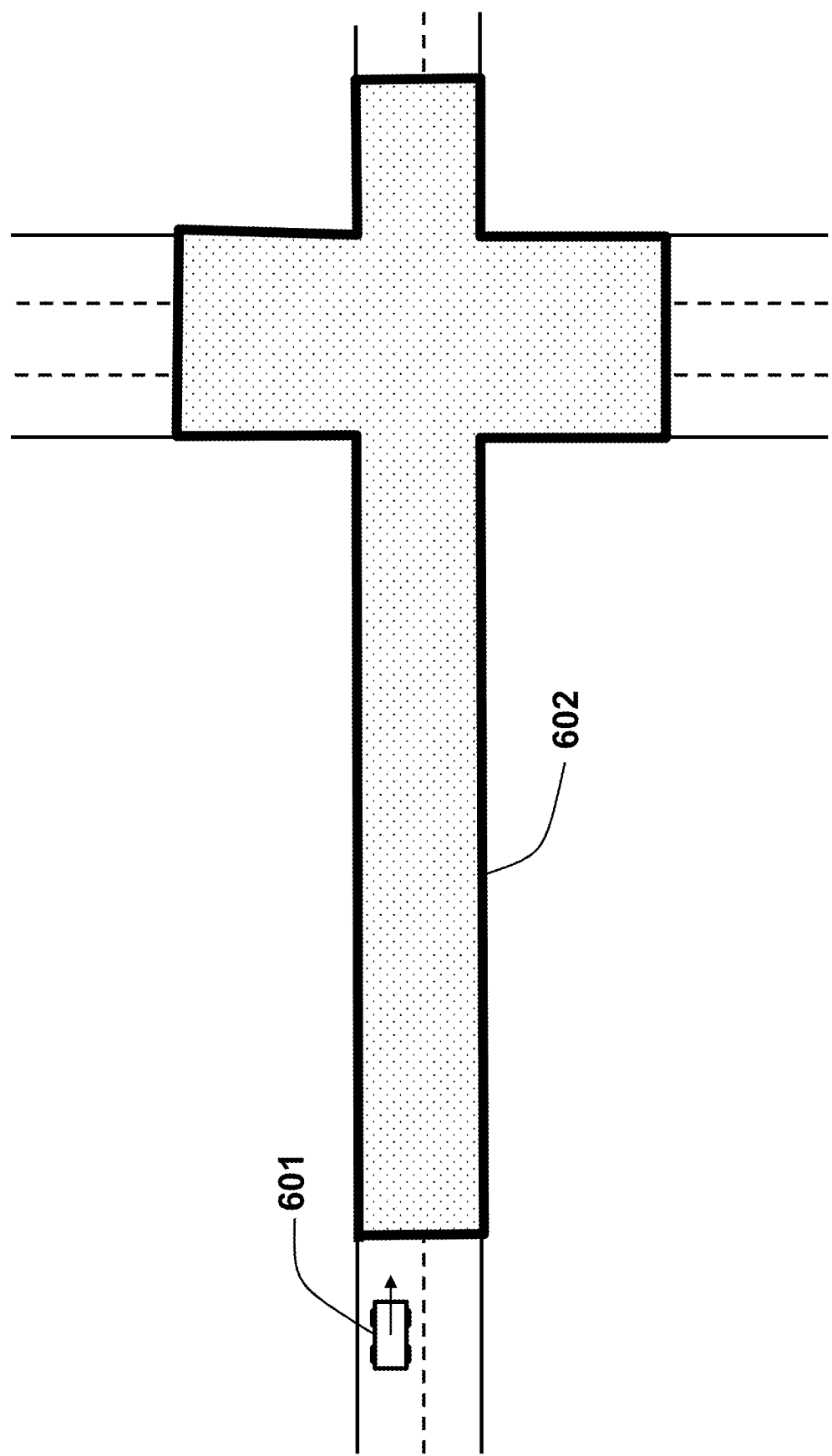
FIGS. 6 and 7 are schematic views of proximity regions.

FIG. 6 illustrates an example. A proximity region 602 typically comprises drivable areas that are reachable from the current location of the AV 601 within a specified driving distance (e.g., within 100 meters, 200 meters, 300 meters, 400 meters, or 500 meters) or a driving time (e.g., within 1 minute, 2 minutes, 5 minutes, 10 minutes, 15 minutes, 30 minutes, or 1 hour). Without restricting a driving distance or a driving time, a proximity region may be too large, leading to a long search time of a target stopping place.

Figure 7:
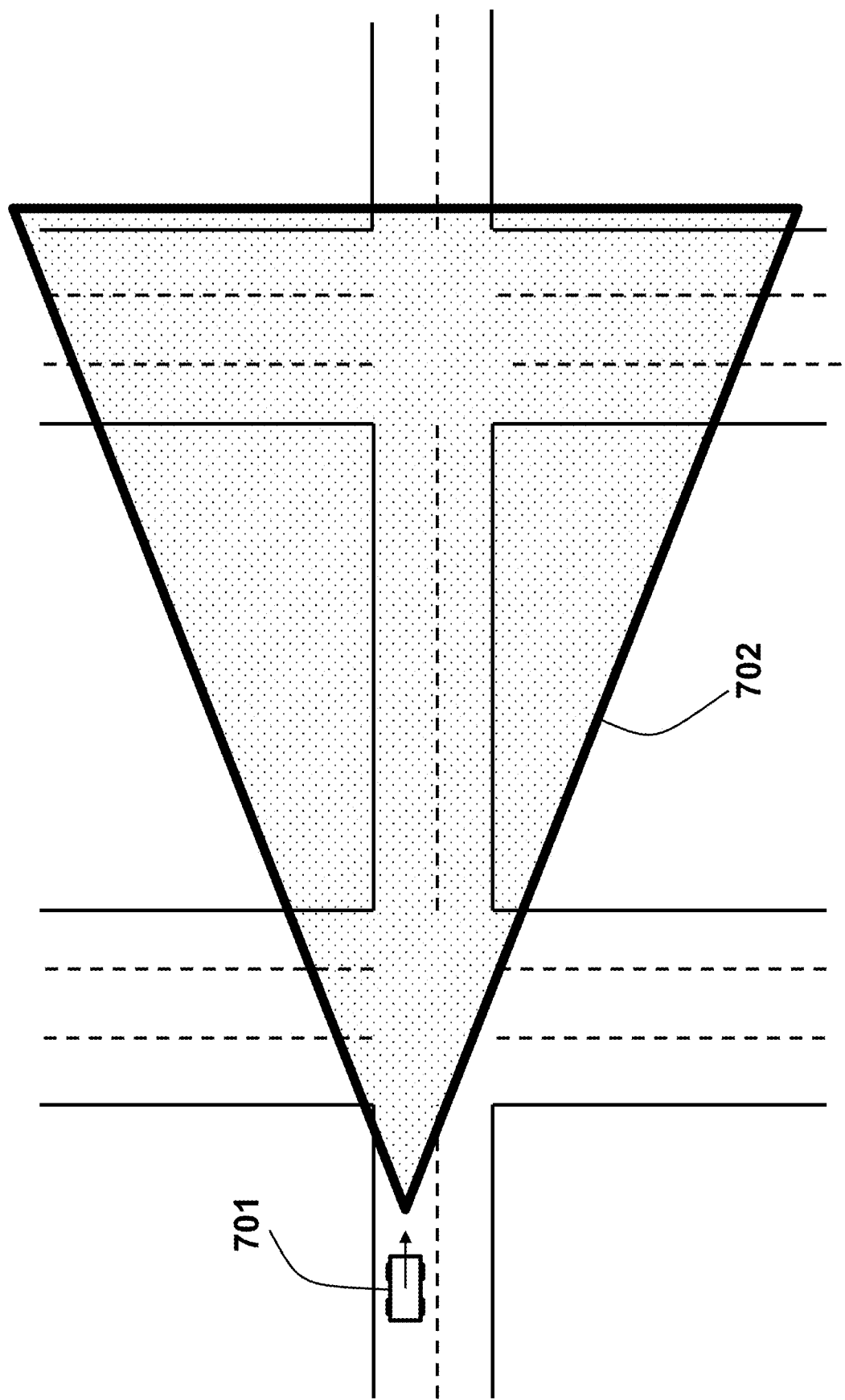

In some cases, the features of the stop request (e.g., a request type, a way of the request being made, and a frequency of the request) determine that the AV must stop very quickly, and a smaller proximity region is preferred to find a target stopping space as soon as possible. FIG. 7 illustrates another example, where a proximity region 702 comprises a forward-facing area of a specified shape and size from the current location of the AV 701.

The proximity region is not restricted to be of any particular shape or size; it can be a triangle, a rectangle, a pentagon, a polygon, or an irregular shape. Some implementations may exclude a region behind the AV or a region difficult to reach or both. The size of a proximity region may depend on the degree of urgency of the stop request. The size may be a function of (e.g., proportional to, or a weighted sum of) one or more of the following: the speed of the AV, the traffic around the AV, and the traffic volume around the AV. For instance, if the stop request has a high degree of urgency, it may be sufficient to choose a relatively small-sized proximity region, as the intention is to stop the AV as soon as possible. Similarly, if the AV is traveling at a high speed, it may be necessary to choose a relatively large-sized proximity region because the AV may take a longer time to reduce its speed to stop.

In some cases, a proximity region excludes road shoulders which are not typically considered to be drivable areas, but the shoulder region may be included if the stop request has a relatively higher degree of urgency.

In some implementations, the features of the stop request (e.g., a request type, a way of the request being made, and a frequency of the request) are such that the AV is still likely to continue to its goal location after the stop, for example, in the case of a change of driving mode from autonomous to manual. It may be desirable to find a target stopping place that does not deviate significantly from the AV's driving trajectory. The proximity region may comprise a region of a specified size or shape around or along the driving trajectory of the AV.

A proximity region may include a drivable area or a non-drivable area, or both. Even within a drivable area, not all locations may be suitable for stopping. Therefore, a subset of the proximity region where stopping is possible or allowed will be determined based on the features of the stop request (e.g., a request type, a way of the request being made, and a frequency of the request), the type of the AV (e.g., a sedan, a truck, a taxi, an SUV, a police car, a metro transit vehicle, an ambulance, or a bus), and known restrictions on stopping. A set of acceptable stopping places that lie within the subset of the proximity region comprises a goal region. Therefore, when the AV system searches for a target stopping place, in some implementations, it considers the stopping places only in the goal region.

A goal region construction process is employed to specify the goal region. The steps of an exemplary goal region construction process are described below.

Figure 8:
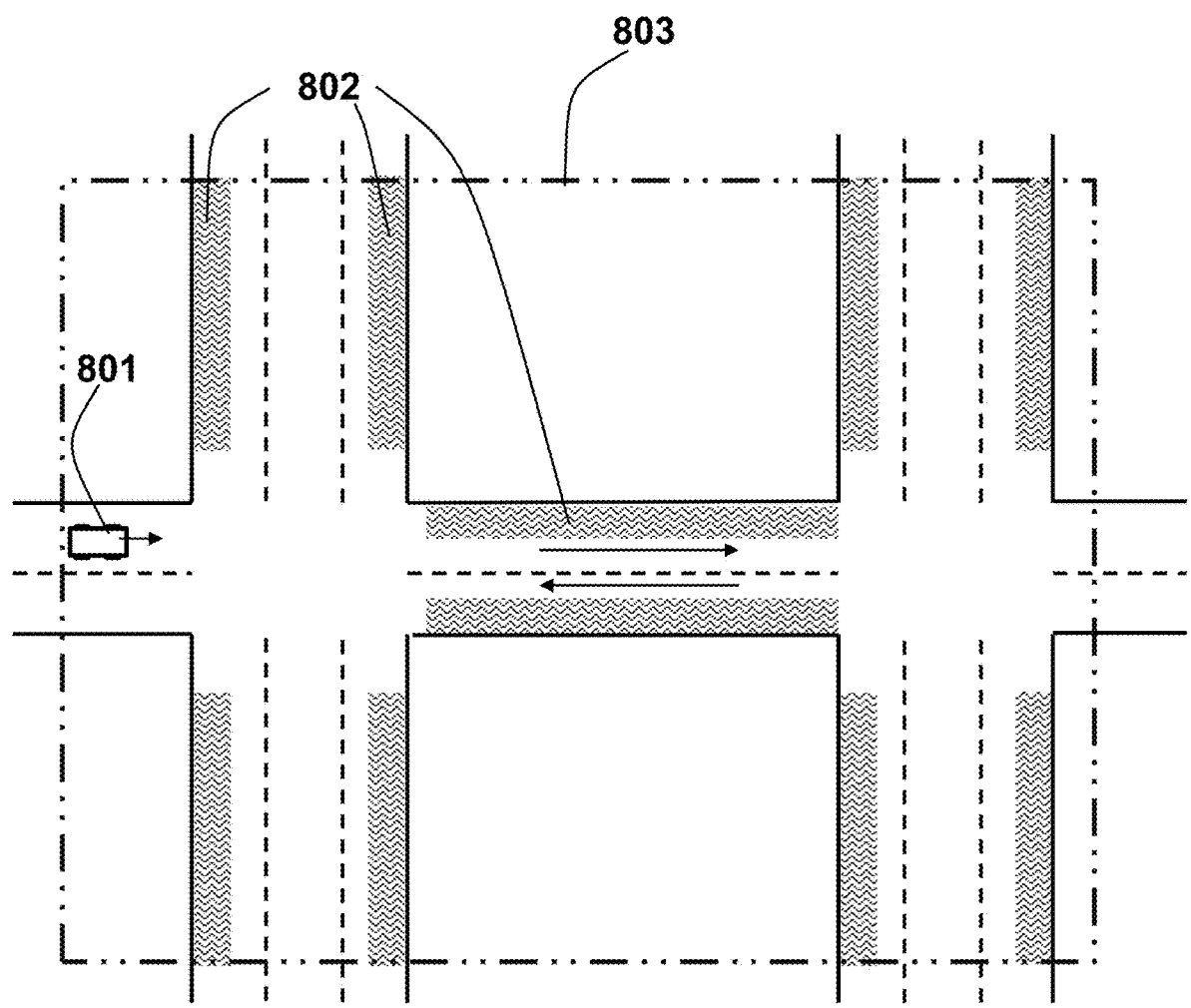
FIGS. 8 through 10 show processes of identifying a goal region.
Figure 9:
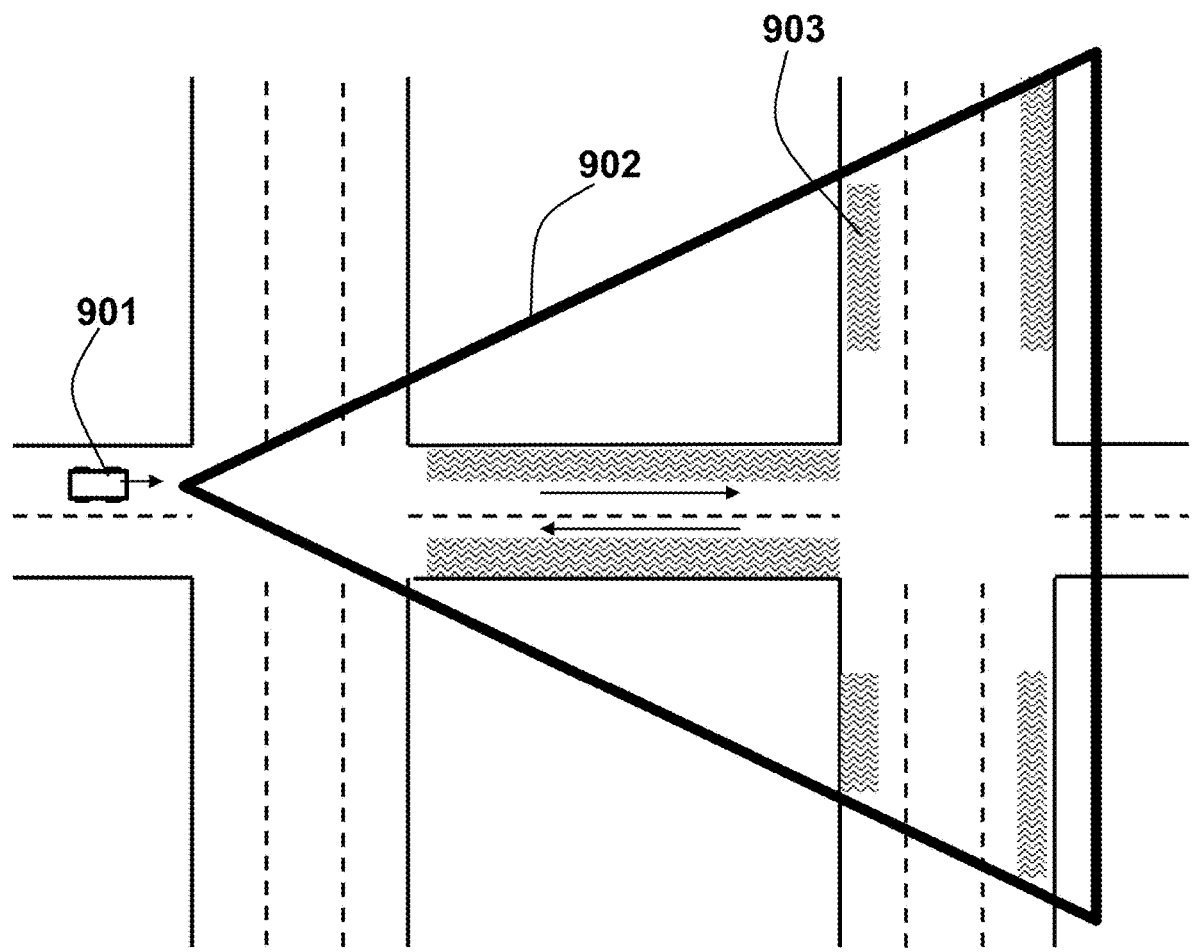
Figure 10:
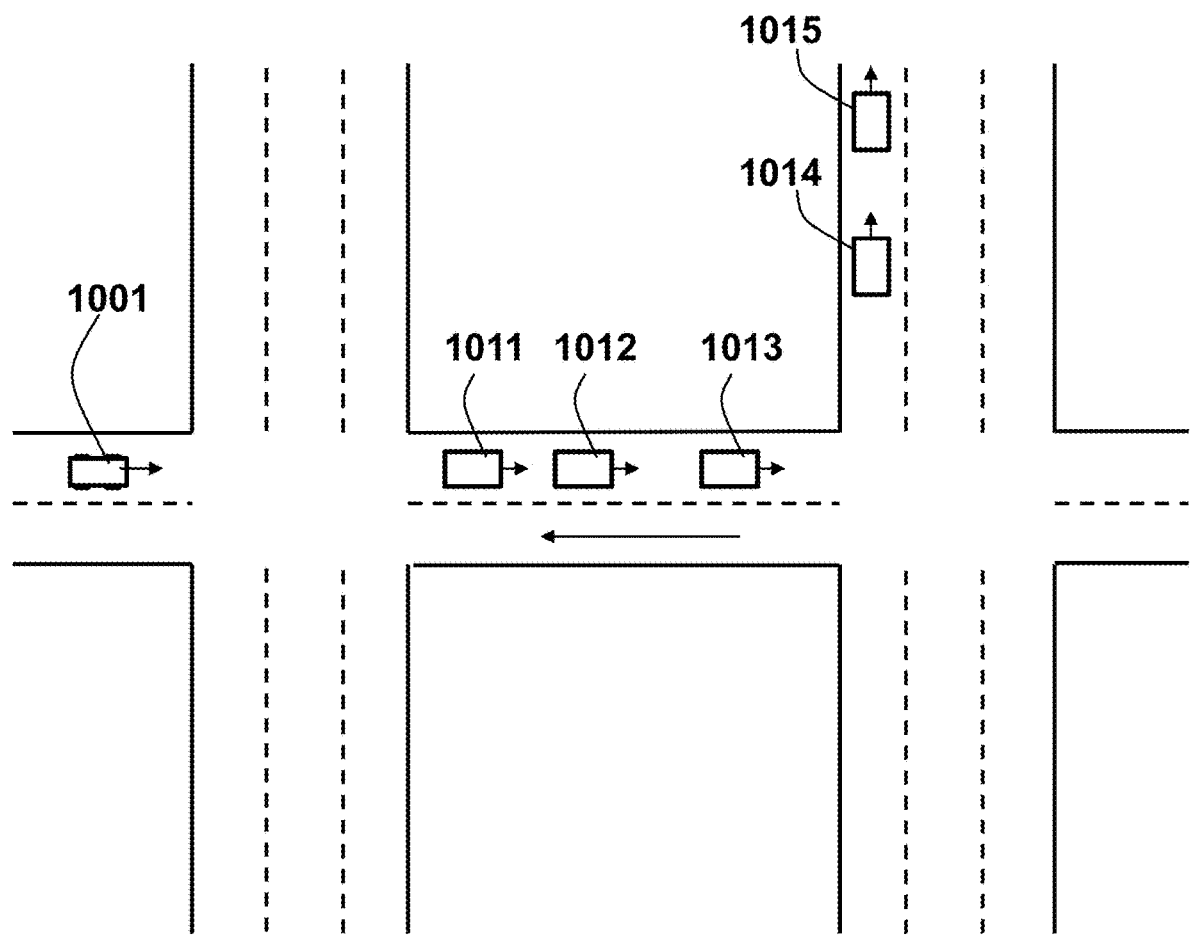

1. A proximity region with a shape is constructed near the AV system's location. This is the region where the search for acceptable stopping places will take place.
2. Determine one or more stopping areas within the proximity region where stopping is allowed. This can be done, for example, by determining the intersection of the areas in the map data where any stopping is allowed, contingent on the features of the stop request (e.g., a request type, a way of the request being made, and a frequency of the request), the type of the AV (e.g., a sedan, a truck, a taxi, an SUV, a police car, a metro transit vehicle, an ambulance, or a bus), and known restrictions on stopping within the proximity region. FIG. 8 and FIG. 9 illustrate this step. Referring to FIG. 8, an AV system 801 is driving on a road. The shaded areas, such as 802, are examples of any stopping areas recorded, online or offline or both, in the map data in the vicinity 803 of the AV 801. Referring to FIG. 9, a proximity region 902 is constructed on top of the road map. The stopping areas remaining within the proximity region 902 (i.e., the shaded areas in FIG. 9, such as the area 903) aggregate for the AV 901 to search for acceptable stopping places.
3. If a stopping area within the proximity region 902 has not been discretized into individual stopping places, the stopping area may be discretized into a set of a finite number of stopping places. For example, the discretization begins with sampling (e.g., random sampling, or uniform sampling) the stopping area. The sampling yields a finite number of points and a stopping place can be constructed around each of the sampled points, for example, by drawing a shape (e.g., a rectangle) around the sampled point. The size of the shape is large enough to accommodate the size and shape of the AV. The orientation of the shape may be encoded in the stopping place, determined by the direction of the traffic flow at that point or by map data. For example, if the sampled point is on a traffic lane, the AV typically must stop in the direction of the traffic flow. The shape would be oriented accordingly and would be characterized by its size, boundaries, and orientation. In some implementations, the discretized stopping places of a stopping area are given by a database; for instance, information of parking spaces on a street or on a parking lot encoded on map data. FIG. 10 shows a set of discretized stopping places marked from 1011 to 1015. In the case shown in FIG. 10, the AV system 1001 keeps the stopping places with the same travel direction, but discards other stopping places with different travel directions. Some implementations may consider a stopping place with a different travel direction; for example, if making a U-turn is easy for the AV to reach the stopping place in the opposite travel direction.

4. Using the quality determination process, the technologies compute the quality of every stopping place within individual stopping areas of the proximity region.
5. Using the threshold determination process, the minimum quality threshold for the stop request is computed.
6. The stopping places within the stopping areas satisfying the quality threshold are acceptable stopping places. The acceptable stopping places aggregate to form a goal region. For example, the stopping places 1011, 1012 and 1013 in FIG. 10 may classified as acceptable stopping places and thus form a goal region for the AV system 1001, while the stopping places 1014 and 1015 not passing the quality threshold are ignored.

If the goal region is empty (i.e., no acceptable stopping place is selected), then the AV system may expand the size or change the shape of the proximity region, or lower the minimum quality threshold, or both, and identify the goal region again. Expanding the empty goal region may be done automatically by the AV system, or semi-automatically by presenting options to an occupant or a teleoperator through a user interface, or by a combination of them. The expansion may be subject to some upper limit beyond which the proximity region cannot be expanded any more, and a lower limit below which the minimum quality threshold cannot be lowered any more.

When the AV is in motion, the goal region construction process may be repeated during the course of time. The proximity region is constructed each time at each new location of the AV; in some implementations, the proximity region construction may be executed, for example, every 1 second, 2 seconds, 3 seconds, 4 seconds, 5 seconds, 10 seconds, 15 seconds, 20 seconds, 30 seconds, 40 seconds, 50 seconds, or 60 seconds, or every 1 meter, 2 meters, 3 meters, 4 meters, 5 meters, 10 meters, 15 meters, 20 meters, 30 meters, 40 meters, 50 meters, 100 meters, 200 meters, 300 meters, 400 meters, or 500 meters. Therefore, even though the goal region may initially be empty, it may become non-empty as the AV is in motion.

In some implementations, a goal region identified at an earlier time may become prior knowledge to, and may be used in, the goal region construction process at a later time.

Figure 11:
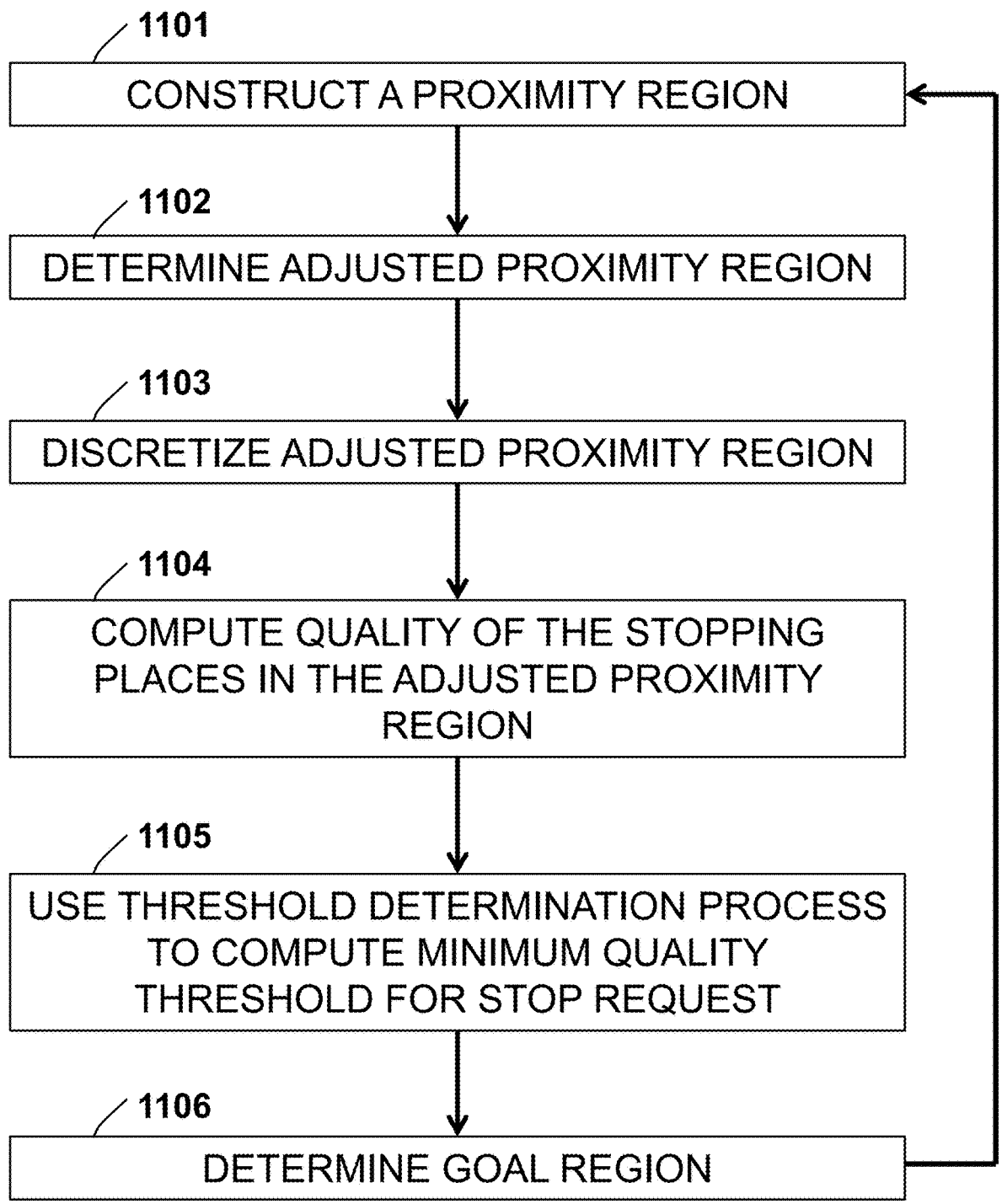
FIG. 11 is a flow diagram of a proximity region construction process.

FIG. 11 summarizes a flowchart of the activities involved in an example of the goal region construction process. Step 1101 constructs a proximity region based on a geometry in the neighborhood of the AV. Step 1102 determines a stopping area within the proximity region. If the stopping area has not been discretized into individual stopping places, step 1103 discretizes the stopping area into a finite set of stopping places. Step 1104 uses outputs of a quality determination process to compute qualities of the stopping places within the stopping area. Step 1105 uses a threshold determination process to compute a minimum threshold to evaluate the qualities of the stopping places. Step 1106 determines a goal region as a set or union of stopping places whose qualities exceed the minimum quality threshold. If a goal region is empty, the proximity region is expanded or the minimum quality threshold is lowered or the AV moves to a new location, or a combination of two or more of them, followed by repeating the goal region construction process.

Perception Process

By construction, every stopping place in the goal region is acceptable. However, not every acceptable stopping place is an available stopping place. Reasons for unavailability include: the presence of another vehicle, or an obstruction (such as temporary construction work or a fallen tree), or an inability of the AV system to reach that stopping place (e.g., no executable trajectory for the AV given its current position, heading and speed).

The AV system may access in map data or maintain its own availability layer that can be treated as an overlay on the acceptable stopping places in map data. The availability layer of the map data identifies, for each acceptable stopping place, whether the acceptable stopping place is an available stopping place.

If no prior information on the availability of stopping places can be acquired, the availability layer can be initialized by assuming that all acceptable stopping places are available stopping places. Prior data about stopping places, if accessible, for example, from previous trips or from other vehicles or from sensor infrastructure or from a database, can be used to initialize the availability layer with acceptable stopping places expected to be available, because the availability information identified by the AV system alone may not be successful, accurate, or complete.

The availability layer is continually updated in real time as, for example, the AV system perceives new information from its sensors. This information can come, for example, from a variety of sensors such as LIDAR, radar, ultrasonic, video camera, infrared, or a combination of two or more of them. Frequently updating the availability layer is important because the AV can stop only at a stopping place that is currently perceived as being available. An acceptable stopping place that was deemed available or unavailable might become unavailable or available, respectively, when the AV approaches the stopping place.

In addition to the last known availability status, the availability layer in the map data may also store the following information for each acceptable stopping place.
1. A timestamp of the most recent update, as it is a measure of the current accuracy of the information. For example, a stopping place that was reported being unavailable two minutes ago, is more likely to remain unavailable than a stopping place that was reported being unavailable twenty minutes ago.
2. The reason for a stopping place's unavailability. For example, if a stopping place was unavailable because of the presence of another car, then the AV system might expect it to become available later; in some implementations, the expectation may be contingent on, for example, an allowed maximum stopping time defined by a regulation. On the other hand, if the stopping place was unavailable because of construction works, the AV system might not expect that the stopping place to become available for the rest of the day or for several days. The AV system could annotate the map data to reflect the circumstance.

The likelihood that an available (or unavailable) stopping place marked in the availability layer becomes unavailable (or available) by the time the AV reaches the stopping place (and vice versa) depends on several factors. Examples of the factors include any one or a combination of two or more of: freshness of the information (e.g., time elapsed since last update); historical statistics on the level of demand for stopping or parking relative to supply in that area at that time of the day; the reason for the unavailability of the stopping place; and the current traffic volumes around the stopping place (derived from the AV system perception process, potentially supplemented by information from sensors onboard and offboard the AV and from another data source). The AV system may use a statistical model to predict the expected availability state of a stopping place, given some or all of the data points, along with a confidence bound for that prediction. Such a metric could contribute to the availability quality of a stopping place. A stopping place that is more likely to be available is has a higher quality level than an equivalent stopping place that is less likely to be available.

The availability layer can be updated using information received from other vehicles (either directly or through a central cloud server). Therefore, as part of an interconnected fleet of AVs or manually driven vehicles that are equipped with V2V (vehicle-to-vehicle) communication capabilities, the AV system might have foreknowledge of the stopping places being available. The availability layer can also be updated using information from sensors of infrastructure (e.g., parking garages, parking lots, parking spaces, street lights, buildings, traffic lights, and traffic signs), or from a data source (e.g., crowd-sourced data), or from combinations of them.

Trajectory Planning Process

Typically, the AV system executes a trajectory planning process as part of its autonomous capability, which attempts to identify a trajectory from the AV system's current position to a specified goal location.

Typically, the AV system executes the trajectory planning process simultaneously and asynchronously with the perception process and the goal region construction process.

The trajectory planning process attempts to select an available stopping place in the goal region as a target stopping place, and to identify a trajectory from the AV system's current location to the target stopping place on a drivable area of a map. The trajectory planning process may continuously update the target stopping place in the goal region (e.g., another available stopping place being selected as a new target stopping place), and a trajectory to reach the target stopping place, if one exists.

There is a trade-off between coming to a stop sooner and spending more time to find a higher quality target stopping place. The way in which the trajectory planning process affects the trade-off may depend on the degree of urgency of the stop request, among other things.

Figure 12:
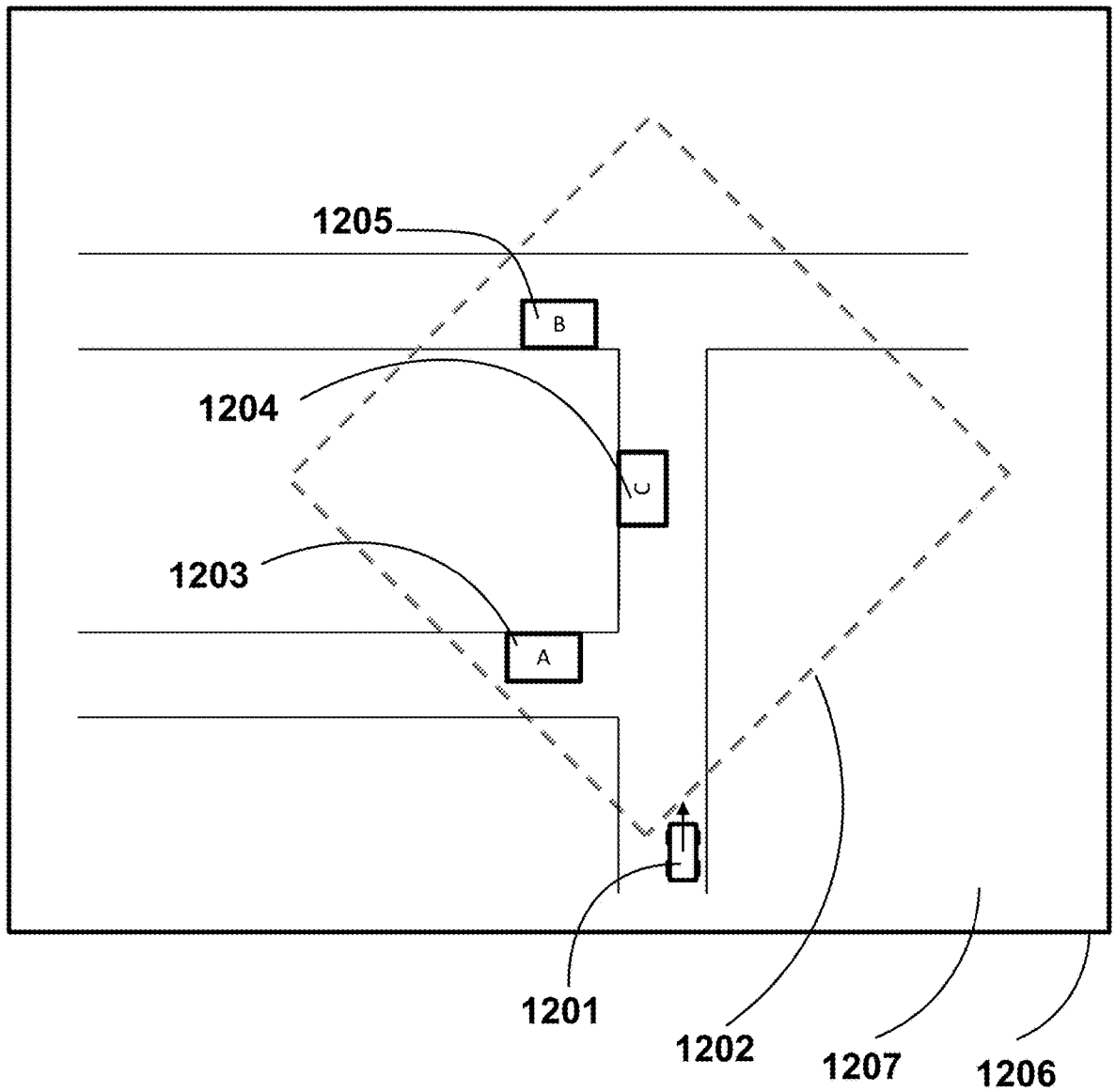
FIG. 12 is a schematic view of trajectory planning.

The trajectory planning process may also allow an occupant, if there is one in the car, or a teleoperator to select a target stopping place, for example, using an interface such as the one depicted in FIG. 12. An interface 1206 presents to a user (e.g., an occupant or a teleoperator) with a map-view 1207 that depicts the AV 1201, the proximity region 1202, and a finite number of available stopping places 1203, 1204 and 1205. These stopping places may be selected by the AV system to meet several criteria, such as: being part of the goal region (e.g., being stopping places within the proximity region that meet the minimum quality threshold), being available (e.g., the availability layer indicates that the stopping place is available or that the trajectory planning process can construct and execute a trajectory from the AV system's current location to the stopping place), being sufficiently different from each other (e.g., which could be measured by a minimum distance between any two stopping places that are displayed or by other factors). The user may be able to select one of the displayed stopping places 1203, 1204 and 1205 using, for example, a mouse point-and-click, or a touch on a touchscreen, or a voice command, or a combination of two or more of them.

In some implementations, there may be no executable trajectory for the AV system to reach the target stopping place; for example, the approaches to the target stopping place are blocked, or the target stopping place is too small to accommodate the AV. Then, the trajectory planning process may update its choice of the target stopping place.

There are scenarios where the goal region or the target stopping place alone, may be updated. Exemplary scenarios are described below.

1. As the AV moves, the degree of urgency may change. For instance, if the AV system observes a worsening of its system performance, the degree of urgency may be increased. Similarly, the reverse is possible. For an increase (or decrease) in the degree of urgency, the AV system may reduce (or increase) the minimum quality threshold, and more (or less) acceptable stopping places are identified within the proximity region.

2. As the AV moves, it might be advisable to update the proximity region, or the target stopping place alone, based on a new location of the AV. The update may ensure that, for instance, the proximity region does not contain stopping places located behind the AV and therefore difficult to reach. On the other hand, the update may be triggered, for example, based on one or more of the following: at a specified regular frequency (e.g., every 5 seconds, 10 seconds, 15 seconds, 20 seconds, 30 seconds, 40 seconds, 50 seconds, 60 seconds, 2 minutes, 5 minutes, 10 minutes, 20 minutes, or 30 minutes), or after the vehicle has traveled more than a certain specified distance (e.g., 5 meters, 10 meters, 15 meters, 20 meters, 30 meters, 40 meters, 50 meters, 100 meters, 200 meters, 300 meters, 400 meters, or 500 meters) from the location where the proximity region was last computed, or new data comes, or a new event is observed, or existing data becomes outdated, or when the target stopping place becomes occupied by another vehicle.

3. The quality of stopping places may change due to dynamic factors, for example, current traffic conditions. The change in quality may induce a change in the acceptability of some stopping places, for example, if the quality measures change to a level above or below a quality threshold.

Among many, these scenarios will let the goal region construction process be executed again, and in turn trigger another execution of the trajectory planning process.

Similarly, as the perception process updates the availability layer, a target stopping place may become unavailable, for example, because the target stopping place turns out to be occupied by another vehicle. On the other hand, it is possible that a more preferred acceptable stopping place within the goal region was previously unavailable but becomes available. Therefore, the target stopping place may be updated or changed, and the perception process may trigger another execution of the trajectory planning process.

Therefore, the trajectory planning process may update the target stopping place and the corresponding trajectory to that target stopping place, multiple times. The trajectory planning process continues as long as the AV has not reached the target stopping place.

The trajectory planning process may sometimes be unable to find a target stopping place, for example, 1. The goal region is empty, either because there is no acceptable stopping place in the proximity region, or because none of the stopping places meets the minimum quality threshold.
2. All acceptable stopping places in the goal region are deemed to be unavailable.

If this is the situation, the AV may continue driving and searching for a target stopping place. When continuing the driving, the proximity region may be updated to include new acceptable stopping places. It is also possible that the availability layer is updated by the perception process and an acceptable stopping place that was previously unavailable now becomes available. The AV may also expand the search space by increasing the size or shape of the proximity region, or by lowering the minimum quality threshold, or both, as described previously.

If the AV is unable to find or reach a target stopping place within a specified amount of time, the AV system may adopt fallback strategies to deal with the difficulty, including but not limited to:

1. Requesting teleoperator assistance. A teleoperator may be able to, for instance, take control of the AV and bring the AV to stop at a location that was not previously considered to be an acceptable stopping place by the AV.
2. Choosing an available stopping place as the target stopping place. The AV system may have access to a list of stopping places that are known to be acceptable and available, such as AV service stations, charging locations, dedicated AV parking spaces or other such locations. This list may be maintained on a cloud or a remote server or another location or may be shared between all the AVs in a fleet. The AV may select a target stopping place from among this list of stopping places that are known to be acceptable and available based on many factors including distance to the stopping place, quality of the stopping place, features of the stop request (e.g., the degree of urgency and the expected stopping time interval), or other factors. While moving towards the target stopping place, the AV may potentially continue to opportunistically look for stopping places on the way that are acceptable and available, and move to a new target stopping place when it is found.
3. In an emergency, the AV may gently decelerate and come to a stop. The AV may also attempt to ensure that it is in the lane nearest to the road shoulder before doing so. The AV may use its blinkers or indicators to alert other vehicles in the traffic.

The trajectory planning process can communicate with an occupant to keep him informed of the AV system's progress. An occupant can be informed that the AV system has found or updated a target stopping place, or informed when the AV has stopped at a target topping place, or both. This communication may take place in a number of ways, for example:

1. Visual communication, via a screen or other display device that is located in the AV, or via a software process that runs on the occupant's smartphone or other device.
2. Aural communication, via voice messages that are played on speakers located in the AV.

Figure 13:
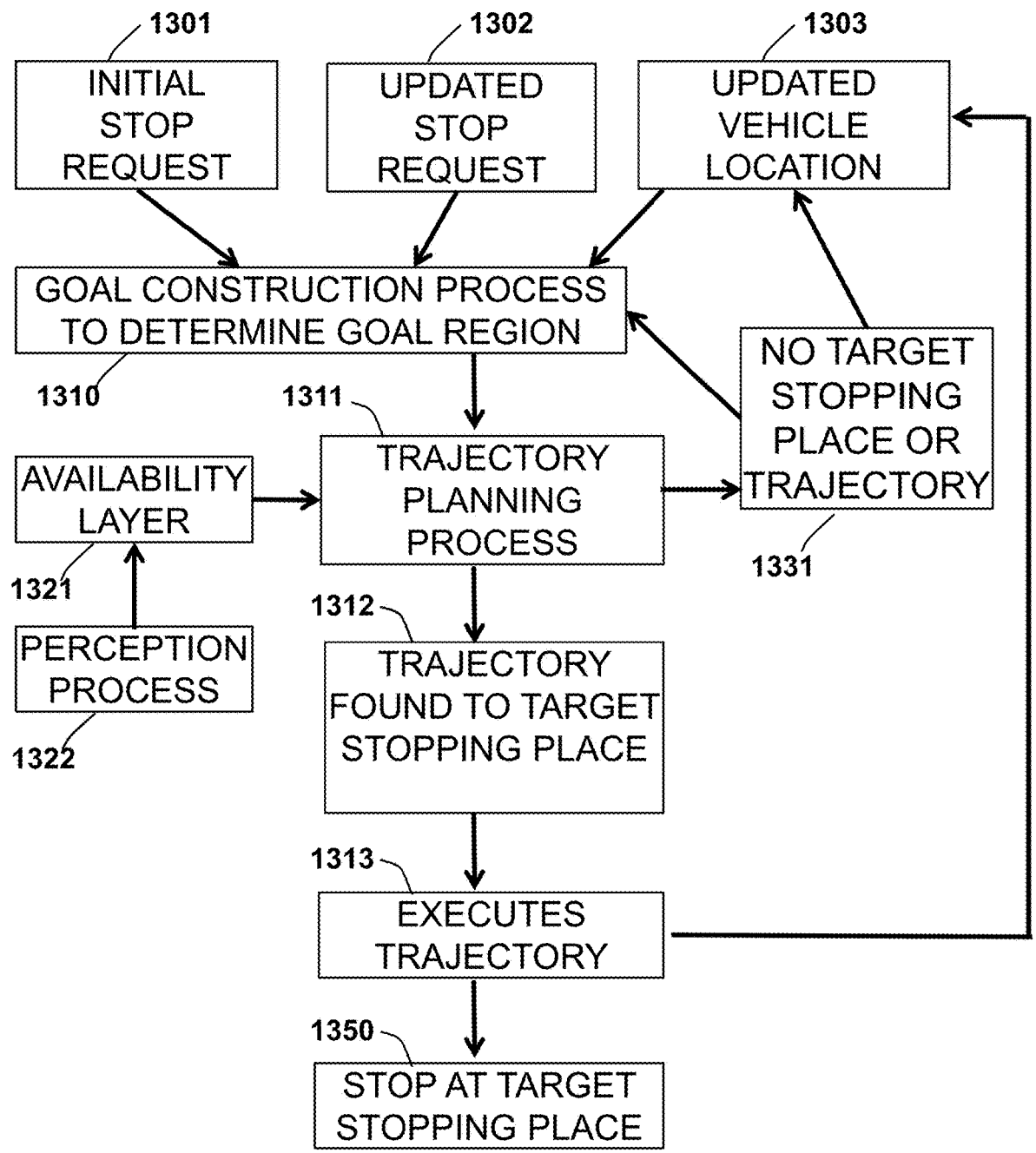
FIG. 13 is a workflow flow diagram of moving an AV to a target stopping place.

FIG. 13 illustrates an exemplary workflow of moving an AV to a stopping place. One or more initial requests 1301 are initiated; in some cases, a stop request may be an updated stop request 1302. The updated stop request may change the minimum quality threshold. The stop request will trigger a goal construction process 1310. Sometimes, the AV system changes its current location 1303, and the new location triggers the goal construction process 1310. The goal construction process determines a goal region comprising acceptable stopping places; in some implementations, the trigger may be due to new information emerging in collected data (e.g., map data, sensor data and road network data) that influences stopping place quality. A trajectory planning process 1311 is then executed to search for a trajectory allowing the AV system to move to a target stopping place. In some implementations, the trajectory planning process 1311 considers data in an availability layer 1321, which may be provided from a perception process 1322. The perception process 1322 constantly receives inputs from sensors and other data sources to update the availability layer 1321. An output of the trajectory planning process 1311 is a trajectory found to reach the target stopping place. When the trajectory cannot identify a target stopping place or a trajectory (step 1331), the AV system may change parameters or expand the previously identified proximity region to search for a target stopping place again. When a stopping place and a trajectory are found, the AV system then executes the trajectory plan 1313. However, during the execution, the target stopping place may become unavailable or the trajectory become inexecutable, and the AV system may provide an updated location 1303 to change the proximity region and reinitiate the goal construction process 1310. A final operation 1350 is to stop the AV at the target stopping place.

Additional information about AVs identifying and reaching stopping places is contained in U.S. patent application Ser. Nos. 15/298,935, 15/298,984, 15/298,970, 15/298,936, and 15/299,028, all of which are incorporated here by reference.

Other implementations are also within the scope of the claims. In some situations, the request may be for the AV to engage in a speed-reducing safety maneuver that does not result in a full stop, such as to pull off the driving lane onto the shoulder and reduce the speed of travel (e.g., significantly) until a hazardous situation has passed or otherwise been addressed. Similar techniques to those described above can be applied to respond to such a non-stopping request.

The invention claimed is:

1. A method comprising:
causing a vehicle to drive autonomously on a trajectory through a road network to a goal location based on an automatic process for planning the trajectory without human intervention;
receiving a request from an occupant of the vehicle to engage in a speed-reducing maneuver; and
in response to receiving the request:
determining a region potentially comprising a target location based on qualities of one or more target locations,
choosing the target location in the region by discretizing the region into potential target places shaped to accommodate the vehicle, and causing the automatic process to alter the planning of the trajectory to reach the target location.

2. The method of claim 1, in which the target location comprises a target stopping place.

3. The method of claim 1, in which the speed-reducing maneuver comprises stopping the vehicle.

4. The method of claim 1, in which the request comprises data received from a user interface in the vehicle as a result of an interaction by the occupant, and the user interface comprises a button, a switch, a pull-cord, a pedal, a pad, a sensor, a whistle, a display, or a voice assistant, or a combination of two or more of them.

5. The method of claim 4, in which the data comprises a degree of urgency.

6. The method of claim 5, comprising inferring the degree of urgency by an analysis of the request.

7. The method of claim 6, in which the analysis comprises analysis of a frequency, a volume, a sound, a voice, or a type, or two or more of them, of an oral request.

8. The method of claim 4, in which the data comprises an expected stopping time interval.

9. The method of claim 8, in which the expected stopping time interval has been indicated by the occupant.

10. The method of claim 8, comprising inferring the expected stopping time interval by an analysis on the request.

11. The method of claim 1, comprising analyzing additional data comprising traffic data, sensor data, or map data, or two or more of them.

12. The method of claim 11, in which analyzing the additional data comprises evaluating the qualities of the one or more target locations.

13. The method of claim 12, in which each quality is evaluated offline relative to the vehicle.

14. The method of claim 12, in which each quality is evaluated online when the vehicle is driving.

15. The method of claim 12, in which evaluating each quality comprises computing a quality based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope.

16. The method of claim 15, in which one or more of the factors are represented by numerical values.

17. The method of claim 16, in which each of the numerical values is mapped to a pre-defined range.

18. The method of claim 15, in which computing each quality comprises assigning weights to one or more of the factors.

19. The method of claim 18, in which the weights are based on one or more of the following: features of the request, a type of the vehicle, a regulation, a degree of urgency, and an expected stopping time interval.

20. The method of claim 12, comprising ignoring one of the one or more target locations based on its quality or information specifying its exclusion.

21. The method of claim 12, comprising classifying the one or more target locations in quality categories.

22. The method of claim 12, in which analyzing the additional data comprises applying a minimum quality threshold to identify one or more acceptable target locations.

23. The method of claim 22, comprising computing the minimum quality threshold based on one or more of the following: a degree of urgency, an expected stopping time interval, and a conflicting rule.

24. The method of claim 1, in which the region comprises a drivable area or a non-drivable area or both.

25. The method of claim 1, in which the region comprises an area faced by a forward-facing side of the vehicle.

26. The method of claim 1, in which the region comprises a shape or a size or both.

27. The method of claim 26, comprising determining the shape or the size based on a traffic condition or on a degree of urgency or on both.

28. The method of claim 1, comprising updating the region based on a new location of the vehicle.

29. The method of claim 1, comprising choosing the target location by using availability data.

30. The method of claim 29, comprising acquiring the availability data from one or more of the following: a crowd-sourced database, a sensor, a perception process, a historical database, a parking lot database, a parking space database, the vehicle, and another vehicle.

31. The method of claim 1, comprising expanding the region when no target location is identified.

32. A method comprising:
causing a vehicle to drive autonomously on a trajectory through a road network to a goal location based on an automatic process for planning the trajectory without human intervention;
receiving a request from an occupant of the vehicle to engage in a speed-reducing maneuver; and
in response to receiving the request:
determining a region potentially comprising a target location based on qualities of one or more target locations, wherein the region comprises a shape or a size or both,
determining the shape or the size of the region based on a traffic condition or on a degree of urgency or on both, and
causing the automatic process to alter the planning of the trajectory to reach the target location.

33. The method of claim 32, in which the target location comprises a target stopping place.

34. The method of claim 32, in which the request comprises data received from a user interface in the vehicle as a result of an interaction by the occupant, and the user interface comprises a button, a switch, a pull-cord, a pedal, a pad, a sensor, a whistle, a display, or a voice assistant, or a combination of two or more of them.

35. The method of claim 34, in which the data comprises a degree of urgency.

36. The method of claim 35, comprising inferring the degree of urgency by an analysis of the request.

37. The method of claim 34, in which the data comprises an expected stopping time interval.

38. The method of claim 37, comprising inferring the expected stopping time interval by an analysis on the request.

39. The method of claim 32, comprising evaluating the qualities of the one or more target locations.

40. The method of claim 39, in which evaluating each quality comprises computing a quality based on one or more of the following factors: an emergency condition, a location of the vehicle on the road network, a traffic speed, a traffic volume, a traffic composition, a lane choice, a blockage degree, a sightline from another vehicle, a distance from an intersection, presence of a dedicated lane, terrain, and a road slope.

41. The method of claim 40, in which computing each quality comprises assigning weights to one or more of the factors.

42. The method of claim 41, in which the weights are based on one or more of the following: features of the request, a type of the vehicle, a regulation, a degree of urgency, and an expected stopping time interval.

43. The method of claim 32, comprising applying a minimum quality threshold to identify one or more acceptable target locations.

44. The method of claim 43, comprising computing the minimum quality threshold based on one or more of the following: a degree of urgency, an expected stopping time interval, and a conflicting rule.

45. The method of claim 32, in which the region comprises a drivable area or a non-drivable area or both.

46. The method of claim 32, in which the region comprises an area faced by a forward-facing side of the vehicle.

47. The method of claim 32, comprising updating the region based on a new location of the vehicle.

48. The method of claim 32, comprising choosing the target location in the region by discretizing the region into potential target places.

49. The method of claim 32, comprising choosing the target location by using availability data.

50. The method of claim 49, comprising acquiring the availability data from one or more of the following: a crowd-sourced database, a sensor, a perception process, a historical database, a parking lot database, a parking space database, the vehicle, and another vehicle.

51. The method of claim 32, comprising expanding the region when no target location is identified.

* * * * *